US009752478B2

(12) United States Patent
Sandou et al.

(10) Patent No.: US 9,752,478 B2
(45) Date of Patent: Sep. 5, 2017

(54) ENGINE DEVICE OF WORKING VEHICLE

(71) Applicant: YANMAR CO., LTD., Osaka (JP)

(72) Inventors: Yoshiyuki Sandou, Osaka (JP);
Tomoyuki Kimura, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/771,943

(22) PCT Filed: Mar. 13, 2014

(86) PCT No.: PCT/JP2014/056610
§ 371 (c)(1),
(2) Date: Sep. 1, 2015

(87) PCT Pub. No.: WO2014/142223
PCT Pub. Date: Sep. 18, 2014

(65) Prior Publication Data
US 2016/0017778 A1    Jan. 21, 2016

(30) Foreign Application Priority Data

Mar. 15, 2013 (JP) .................................. 2013-053380

(51) Int. Cl.
*F01N 3/035* (2006.01)
*A01D 41/12* (2006.01)
(Continued)

(52) U.S. Cl.
CPC .............. *F01N 3/035* (2013.01); *A01D 41/12* (2013.01); *B60K 13/04* (2013.01); *F01N 3/021* (2013.01);
(Continued)

(58) Field of Classification Search
CPC ...... F02D 41/029; F01N 9/002; F01N 3/0842; F01N 13/02; F01N 3/035
(Continued)

(56) References Cited

U.S. PATENT DOCUMENTS 8,979,125 B2    3/2015  Sato et al.
2010/0196219 A1  8/2010  Endo et al.
(Continued)

FOREIGN PATENT DOCUMENTS

JP    2009-074420    4/2009
JP    2010-051216    3/2010
(Continued)

OTHER PUBLICATIONS

Machine Translation of JP-2010051216, Translated on Jun. 16, 2016.*
(Continued)

*Primary Examiner* — Patrick Maines
(74) *Attorney, Agent, or Firm* — Norris McLaughlin & Marcus, P.A.

(57) ABSTRACT

An engine device of a working vehicle is structured such that a first case and a second case can be firmly fixed with a high rigidity by making good use of a frame of an engine room. In the engine device of the working vehicle having the first case which removes particulate matter in exhaust gas of the engine and the second case which removes nitrogen oxide in the exhaust gas of the engine, the first case is provided in the engine room which is inward provided with the engine, via a first case support body, and the second case is provided in the engine room via second case support bodies.

2 Claims, 19 Drawing Sheets

(51) Int. Cl.
*B60K 13/04* (2006.01)
*F01N 3/10* (2006.01)
*F01N 3/20* (2006.01)
*F01N 13/00* (2010.01)
*F01N 3/021* (2006.01)
*F01N 3/28* (2006.01)

(52) U.S. Cl.
CPC .............. *F01N 3/0211* (2013.01); *F01N 3/10* (2013.01); *F01N 3/106* (2013.01); *F01N 3/2066* (2013.01); *F01N 3/2839* (2013.01); *F01N 13/009* (2014.06); *B60Y 2200/222* (2013.01); *F01N 2260/20* (2013.01); *F01N 2340/04* (2013.01); *F01N 2590/08* (2013.01); *Y02T 10/24* (2013.01)

(58) Field of Classification Search
USPC .................. 60/295, 301, 299, 311; 180/89.2
See application file for complete search history.

(56) References Cited

U.S. PATENT DOCUMENTS

| | | | |
|---|---|---|---|
| 2012/0247861 | A1 | 10/2012 | Mizuno et al. |
| 2013/0343853 | A1 | 12/2013 | Sato et al. |
| 2015/0306950 | A1* | 10/2015 | Sandou ................. E02F 9/0866 60/297 |
| 2016/0010525 | A1* | 1/2016 | Sandou ................. A01D 41/12 60/301 |
| 2016/0024752 | A1* | 1/2016 | Mitsuda ................. E02F 9/0866 180/296 |
| 2016/0040568 | A1* | 2/2016 | Sandou ................. F01N 3/2066 180/309 |
| 2016/0053645 | A1* | 2/2016 | Sandou ................. F01N 3/2066 60/301 |
| 2016/0082830 | A1* | 3/2016 | Okamura ............. F01N 3/2066 180/309 |

FOREIGN PATENT DOCUMENTS

| | | | | |
|---|---|---|---|---|
| JP | 2010-051239 | | 3/2010 | |
| JP | 2010051216 A | * | 3/2010 | ............... F01N 3/02 |
| JP | 2010-083331 | | 4/2010 | |
| JP | 2010-209813 | | 9/2010 | |
| JP | 2010-216336 A | | 9/2010 | |
| JP | 2010216336 A | * | 9/2010 | |
| JP | 2012-021505 | | 2/2012 | |
| JP | 2012-177233 | | 9/2012 | |
| JP | 2012-219624 | | 11/2012 | |
| JP | 2012-219625 A | | 11/2012 | |
| JP | 2012219624 A | * | 11/2012 | ............... F01N 3/24 |
| WO | 2011/152306 A1 | | 12/2011 | |

OTHER PUBLICATIONS

Machine Translation of JP-2012219624, Translated on Jun. 16, 2016.*

* cited by examiner

ENGINE DEVICE OF WORKING VEHICLE

TECHNICAL FIELD

The present invention relates to an engine device of a working vehicle such as a combine harvester which reaps grain straws planted on a farm field and collects grains, or a feeding stuff combine harvester which reaps grain straws for feeding stuff and collects the grain straws for the feeding stuff, and more particularly to an engine device of a working vehicle provided with an exhaust gas purification device which removes particulate matter (soot and particulate) included in exhaust gas of a diesel engine, or nitrogen oxide (NOx) included in the exhaust gas.

BACKGROUND OF THE INVENTION

Conventionally, there has been known a technique of purifying exhaust gas discharged from a diesel engine by setting in an exhaust passage of the diesel engine a case (hereinafter, refer to as DPF case) which is inward provided with a diesel particulate filter, and a case (hereinafter, refer to as SCR case) which is inward provided with an urea selective reduction type catalyst, as an exhaust gas purification device (an exhaust gas post-treatment device), and introducing exhaust gas to the DPF case and the SCR case (refer, for example, to Patent Documents 1 to 3). Further, a combine harvester has been conventionally structured such as to cut unreaped grain straws in a farm field by a reaping blade device, convey the reaped grain straws to a threshing device by a grain straw conveyance device to thresh, and collect the grains in a cereal grain tank, and is structured such that an engine is mounted to a travel machine body, the DPF case is arranged in a transversely directing posture on an upper surface side of the engine, and the exhaust gas is discharged from the engine toward the DPF case (refer, for example, to Patent Document 4).

CITATION LIST

Patent Document 1: Japanese Unexamined Patent Publication No. 2009-74420
Patent Document 2: Japanese Unexamined Patent Publication No. 2012-21505
Patent Document 3: Japanese Unexamined Patent Publication No. 2012-177233
Patent Document 4: Japanese Unexamined Patent Publication No. 2010-209813

SUMMARY OF INVENTION

In the case that the DPF case and the SCR case are assembled while being spaced form the engine, as in the Patent Document 1 or 2, a temperature of the exhaust gas supplied from the engine to the DPF case or the SCR case decreases, and regeneration of a diesel particulate filter or a chemical reaction such as a selective catalyst reduction action tends to become incomplete. As a result, there is a problem of necessity of a specific device for maintaining the temperature of the exhaust gas within the SCR case at a high temperature.

On the other hand, in the case that the DPF case and the SCR case are assembled in the engine as in the Patent Document 3 or 4, the temperature of the exhaust gas within the SCR case can be easily maintained at a high temperature by reducing the temperature reduction of the exhaust gas supplied from the engine to the SCR case. However, it is necessary to secure an installation space for the DPF case and the SCR case in an outer peripheral portion of the engine, and there is a problem that the DPF case or the SCR case can not be easily supported as well as an outer shape dimension of the engine room is hard to be structured compact. Further, in a narrow engine room, there is a problem that it is impossible to improve an assembling workability or a maintenance workability of the DPF case or the SCR case.

Consequently, the present invention aims at providing an engine device of a working vehicle to which an improvement is applied by making a study of the actual condition.

In order to achieve the object mentioned above, the invention according to a first aspect of the invention is an engine device of a working vehicle having a first case which removes particulate matter in exhaust gas of an engine, and a second case which removes nitrogen oxide in the exhaust gas of the engine, wherein the first case is provided in an engine room which is inward provided with the engine, via a first case support body, and the second case is provided in the engine room via a second case support body.

The invention according to a second aspect of the invention is the engine device of the working vehicle described in the first aspect, wherein the second case is connected to the first case via an urea mixing pipe, a tail pipe is connected to the second case, a moving direction of the exhaust gas in the first case is brought into line with a back-and-forth direction of a travel machine body, a moving direction of the exhaust gas in the second case is brought into line with a vertical direction of the travel machine body, and a moving direction of the exhaust gas in the engine is changed by the urea mixing pipe.

The invention according to a third aspect of the invention is the engine device of the working vehicle described in the first aspect, wherein a threshing device is arranged in adjacent to the engine room, the first case is supported transversely between the engine room and the threshing device, and the second case is supported vertically to a side surface of the engine room.

On the basis of the invention according to the first aspect of the invention, in the engine device of the working vehicle having the first case which removes the particulate matter in the exhaust gas of the engine, and the second case which removes the nitrogen oxide in the exhaust gas of the engine, the first case is provided in the engine room which is inward provided with the engine, via the first case support body, and the second case is provided in the engine room via the second case support body. As a result, loads of the first case and the second case can be borne by the frame of the engine room, and the first case and the second case can be firmly fixed with a high rigidity by making good use of the frame of the engine room. For example, in the combine harvester which mounts the engine in a lateral side of the rear portion of the threshing device, the first case can be compactly assembled transversely between the engine room and the threshing device, and the second case can be compactly assembled vertically with a simple supporting structure in a rear surface side of the engine room.

On the basis of the invention according to the second aspect of the invention, the second case is connected to the first case via the urea mixing pipe, the tail pipe is connected to the second case, the moving direction of the exhaust gas in the first case is brought into line with the back-and-forth direction of the travel machine body, the moving direction of the exhaust gas in the second case is brought into line with the vertical direction of the travel machine body, and the moving direction of the exhaust gas in the engine is changed by the urea mixing pipe. As a result, it is possible to connect the first case transversely arranged and the second case vertically arranged by an L-shaped exhaust gas connection path, it is possible to easily form the L-shaped exhaust gas connection path by the urea mixing pipe, and it is possible to easily construct the urea mixing structure for ejecting the urea water into the exhaust gas leading to the second case.

On the basis of the invention according to the third aspect of the invention, the threshing device is arranged in adjacent to the engine room, the first case is supported transversely between the engine room and the threshing device, and the second case is supported vertically to the side surface of the engine room. As a result, in spite of the structure in which the first case support body can be hanged between the engine room and the threshing device and the first case can be easily installed in a narrow space between the engine room and the threshing device, the second case support body can be installed as a vertically long structure in a rear face side frame of the engine room, it is possible to compactly arrange the second case and the tail pipe connected to the second case to the second case support body of the vertically long supporting structure, and it is possible to improve an assembling workability or a maintenance workability of the first case or the second case.

DESCRIPTION OF THE PREFERRED EMBODIMENTS

Figure 1:
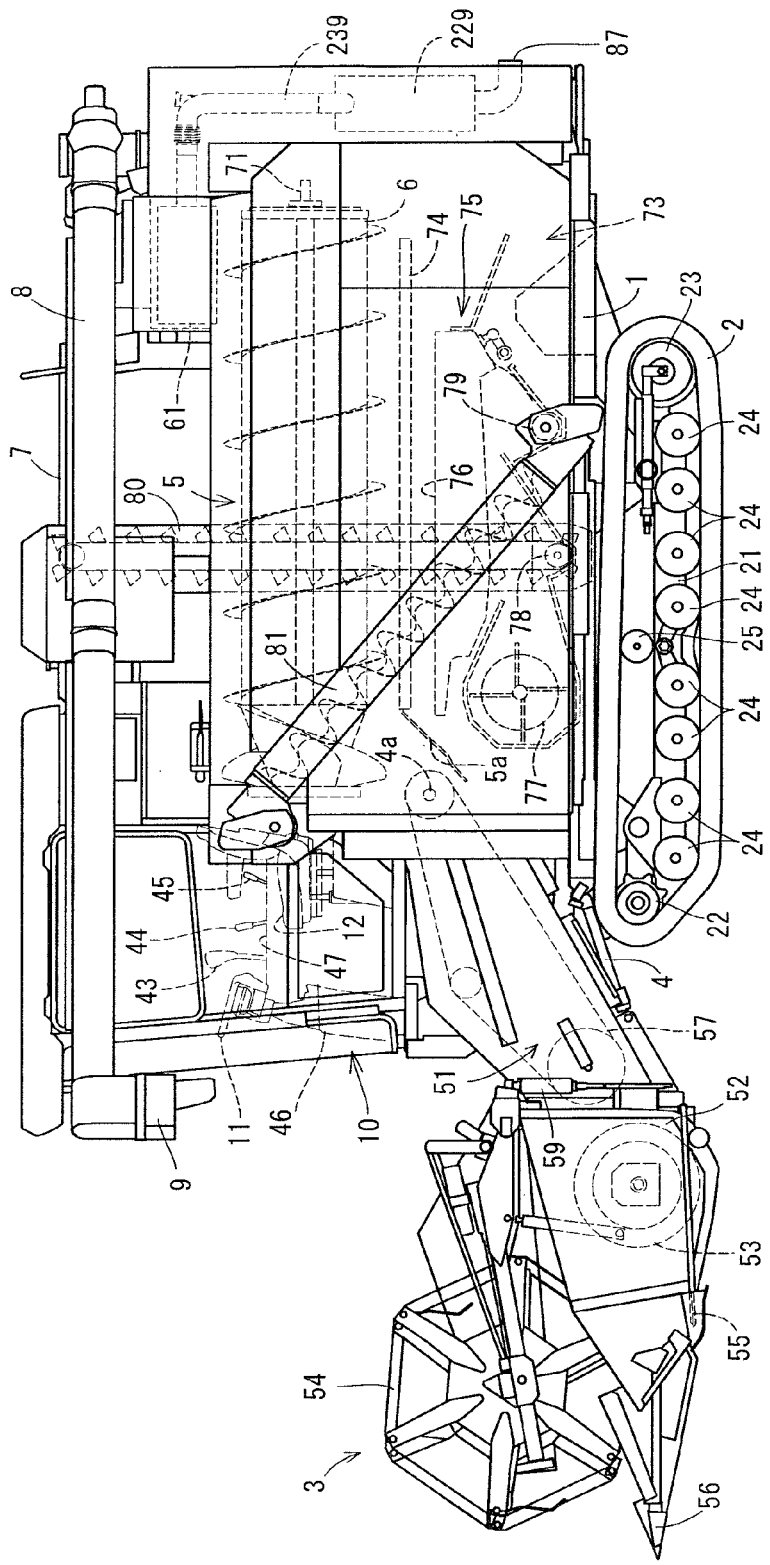
FIG. 1 is a left side elevational view of a general purpose combine harvester according to an embodiment of the present invention.
Figure 2:
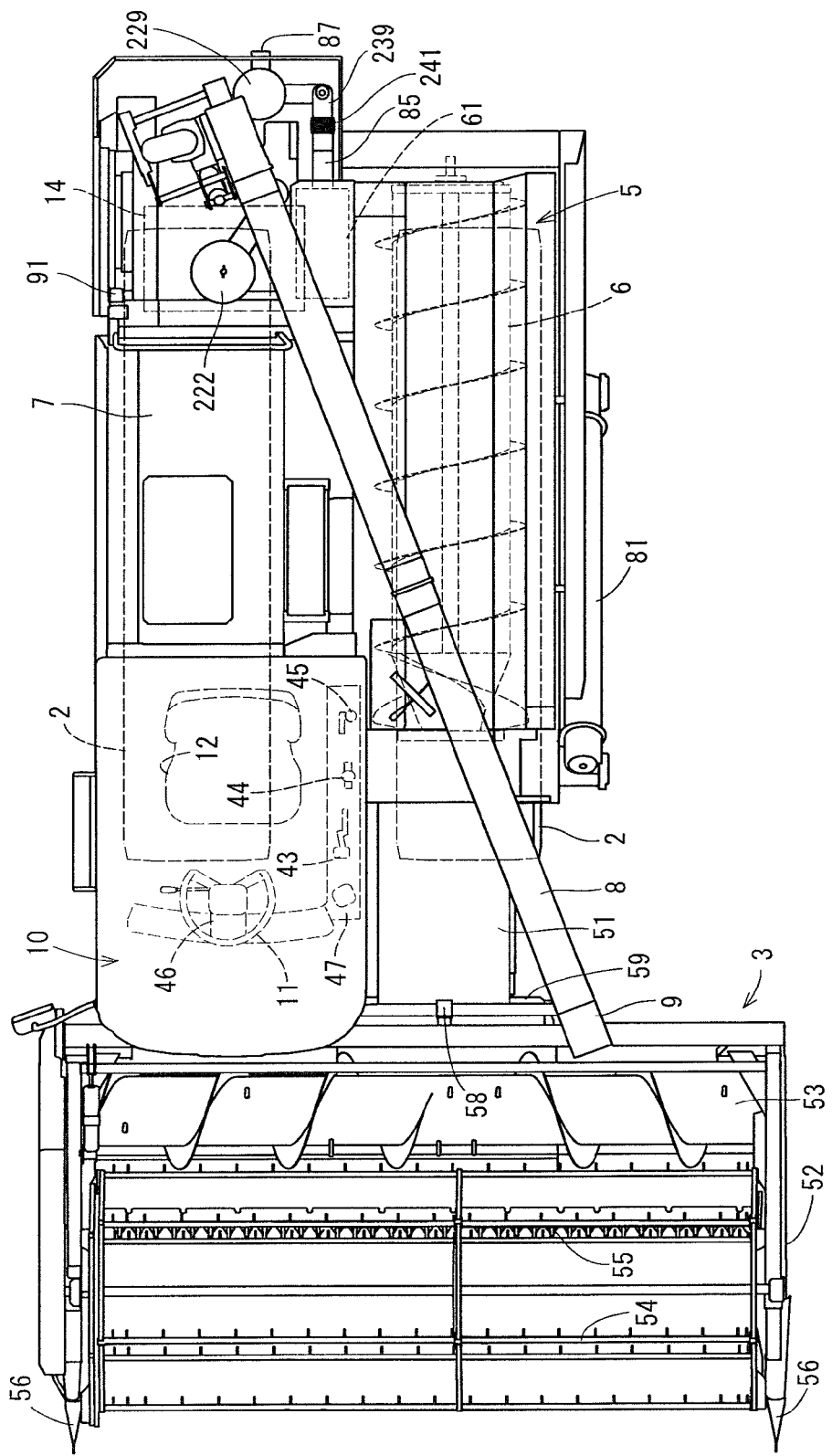
FIG. 2 is a plan view of the same.
Figure 3:
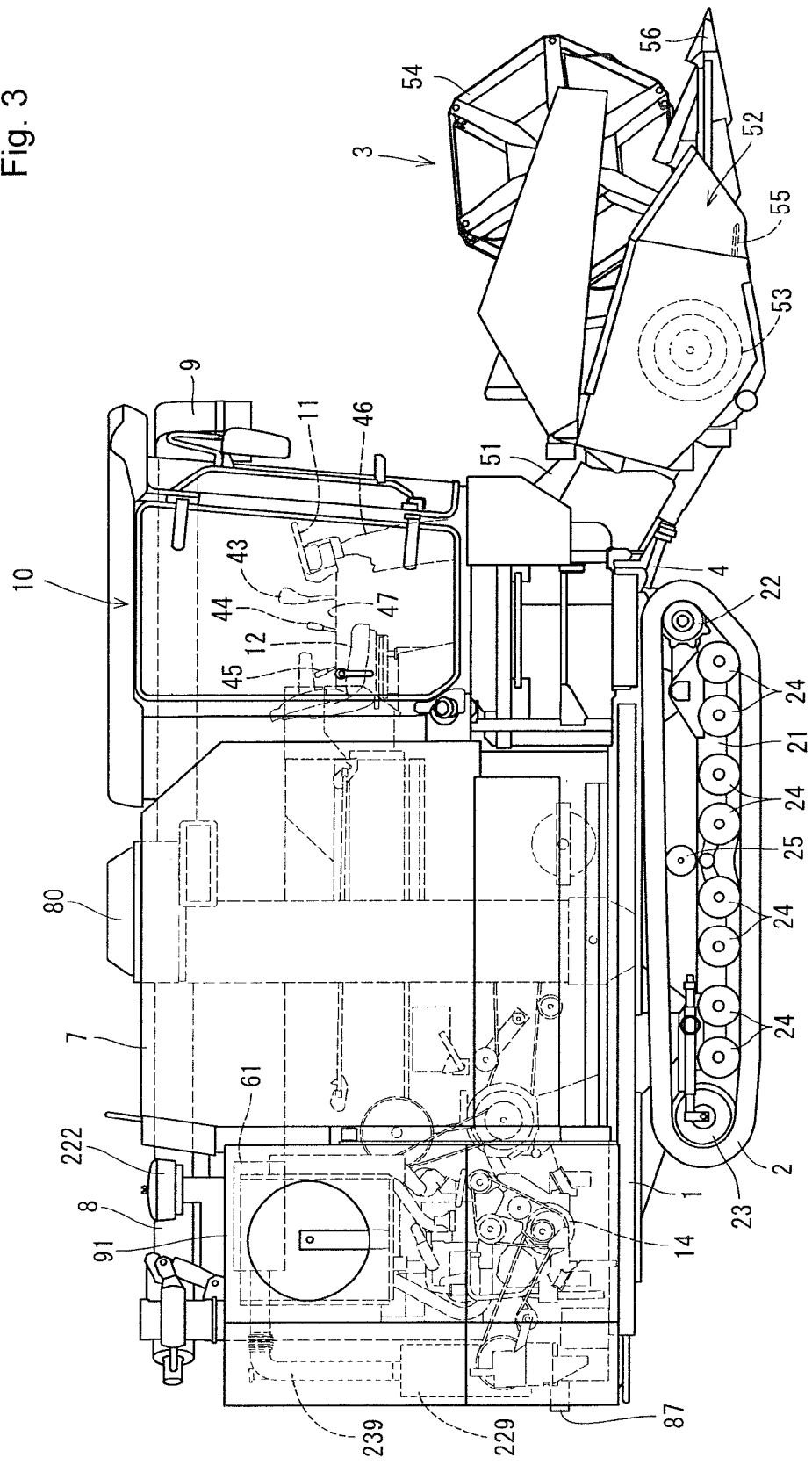
FIG. 3 is a right side elevational view of the same.

A description will be given below of an embodiment obtained by embodying the present invention with reference to the accompanying drawings. A description will be given of an overall structure of a general purpose combine harvester with reference to FIGS. 1 to 3. In the following description, a left side as facing a forward moving direction of a travel machine body 1 is simply called as a left side, and a right side as facing the forward moving direction is simply called as a right side in the same manner. As shown in FIGS. 1 to 3, the travel machine body 1 supported by a pair of right and left traveling crawlers 2 is provided as the traveling portion. A reaping device 3 is installed to a front portion of the travel machine body 1 so as to be adjustable its elevation around a reaping rotation supporting point shaft 4a by a single acting type elevating hydraulic cylinder 4, the reaping device 3 taking in grain straws while reaping. A threshing device 5 and a cereal grain tank 7 are mounted to the travel machine body 1 in a horizontally arranged manner, the threshing device 5 having a threshing cylinder 6, and the cereal grain tank 7 storing grains taken out of the threshing device 5. The threshing device 5 is arranged in a left side in a forward moving direction of the travel machine body 1, and the cereal grain tank 7 is arranged in a right side in the forward moving direction of the travel machine body 1. A discharge auger 8 capable of swiveling is provided in a rear portion of the travel machine body 1, and is structured such that the grains in an inner portion of the cereal grain tank 7 are discharged out of an unhulled rice throwing port 9 of the discharge auger 8 to a bed of a truck, a container or the like. A driver cabin 10 is provided in a front lateral side of the cereal grain tank 7 in a right lateral side of the reaping device 3.

Within the driver cabin 10, there are arranged a control steering wheel 11, a driver seat 12, a main transmission lever 43, a sub transmission lever 44, and an operation clutch lever 45 which operates the threshing clutch and the reaping clutch to turn on and off. In the driver cabin 10, there are arranged a step on which an operator gets, a steering wheel column 46 which is provided with the control steering wheel 11, and a lever column 47 which is provided with the levers 43, 44 and 45. A diesel engine 14 as a power source is arranged on a travel machine body 1 in a rear side of the cereal grain tank 7.

As shown in FIGS. 1 and 3, right and left truck frames 21 are arranged in a lower surface side of the travel machine body 1. The truck frame 21 is provided with a drive sprocket 22 which transmits power of the diesel engine 14 to the traveling crawler 2, a tension roller 23 which maintains tension of the traveling crawler 2, a plurality of truck rollers 24 which keep a ground contact side of the traveling crawler 2 in a ground contact state, front and rear intermediate rollers 25 which keep a non-ground contact side of the traveling crawler 2. The front side of the traveling crawler 2 is supported by the drive sprocket 22, the rear side of the traveling crawler 2 is supported by the tension roller 23, the ground contact side of the traveling crawler 2 is supported by the truck rollers 24, and the non-ground contact side of the traveling crawler 2 is supported by the intermediate rollers 25.

As shown in FIGS. 1 to 3, the reaping device 3 is provided with a feeder house 51 which is communicated with a threshing port 5a in a front portion of the threshing device 5, and a horizontally long bucket-shaped cereal grain header 52 which is continuously provided in a front end of the feeder house 51. A raking auger 53 (a platform auger) is axially supported rotatably within the cereal grain header 52. A raking reel 54 with tine bars is arranged in a front upper side of the raking auger 53. A hair clipper-shaped reaping blade 55 is arranged in a front portion of the cereal grain header 52. Right and left grass dividing bodies 56 are provided in a protruding manner in both right and left sides of the front portion of the cereal grain header 52. Further, a feed conveyor 57 is inward provided in the feeder house 51. A lower surface portion of the feeder house 51 and a front end portion of the travel machine body 1 are connected via an elevating hydraulic cylinder 4, and the reaping device 3 is moved up and down by the elevating hydraulic cylinder 4 around a reaping rotation supporting point shaft 4a (a feeder house conveyor shaft corresponding to a reaping input shaft) as an elevation supporting point.

According to the structure mentioned above, an ear tip side of unreaped grain straws between the right and left grass dividing bodies 56 is raked by the raking reel 54, a culm of the unreaped grain straws is reaped by the reaping blade 55, and the reaped grain straws are collected near an inlet of the feeder house 51 which is closer to the center portion of a lateral width of the cereal grain header 52, on the basis or a rotating drive of the raking auger 53. A total amount of the reaped grain straws of the cereal grain header 52 is structured such as to be conveyed by the feed conveyor 57 and be thrown in the threshing port 5a of the threshing device 5.

Further, as shown in FIGS. 1 and 2, the cereal grain header 52 is connected to a front portion of the feeder house 51 via a lateral inclination adjustment supporting point shaft 58 so as to be adjustable in a lateral inclination. There is provided a hydraulic rolling cylinder 59 for lateral inclination adjustment which turns the cereal grain header 52 around the lateral inclination adjustment supporting point shaft 58, and the cereal grain header 52, the reaping blade 55 and the raking reel 54 are supported horizontally in relation to a farm field surface, by adjusting an angle of inclination in a lateral direction of the cereal grain header 52 by the rolling cylinder 59.

Further, as shown in FIGS. 1 to 3, the threshing cylinder 6 is rotatably provided within the threshing chamber of the threshing device 5. The threshing cylinder 6 is axially supported to a threshing cylinder shaft 71 which is extended in a back-and-forth direction of the travel machine body 1. A receiving net 74 leaking down the grain is provided in a tensioning manner in a lower side of the threshing cylinder 6. A screw blade-like intake blade formed into a spiral shape is provided so as to protrude outward in a radial direction.

According to the structure mentioned above, the reaped grain straws thrown in from the threshing port 5a are mixed and threshed between the threshing cylinder 6 and the receiving net 74 while being conveyed toward a rear side of the travel machine body 1 on the basis of the rotation of the threshing cylinder 6. The threshed matters such as the grains which are smaller than a mesh of the receiving net 74 leak down from the receiving net 74. The straw wastes which do not leak down from the receiving net 74 are discharged to the farm field from a dust exhaust port 73 in a rear portion of the threshing device 5 on the basis of a conveying action of the threshing cylinder 6.

A plurality of dust sending valves (not shown) are pivoted rotatably in an upper side of the threshing cylinder 6, the dust sending valves adjusting a conveying speed of the threshed materials within the threshing chamber. It is possible to adjust the conveying speed (a staying time) of the threshed materials within the threshing chamber according to a variety and a nature of the reaped grain straws, by adjusting an angle of the dust sending valves. Meanwhile, there is provided an oscillation sorting board 76 for specific gravity sorting having a grain pan, a chaff sieve, a grain sieve and a straw rack as a grain sorting mechanism 75 which is arranged below the threshing device 5.

Further, a winnower fan 77 supplying sorting wind to the oscillation sorting board 76 is provided as the grain sorting mechanism 75. The threshed materials threshed by the threshing cylinder 6 and leaking down from the receiving net 74 are sorted into grains (first class grains such as fine grains), mixture of the grains and the straws (second class grains such as rachis-branched grains), and the straw wastes so as to be taken out, on the basis of a specific gravity sorting action of the oscillation sorting board 76 and a wind sorting action of the winnower fan 77.

A first class grain conveyor mechanism 78 and a second class grain conveyor mechanism 79 are provided as the grain sorting mechanism 75 in a lower side of the oscillation sorting board 76. The grains (the first class grains) coming down from the oscillation sorting board 76 by the sorting of the oscillation sorting board 76 and the winnower fan 77 are collected into the grain tank 7 by the first class grain conveyor mechanism 78 and a grain elevating conveyor 80. The mixture of the grains and the straws (the second class grains) are returned to the threshing start end side of the threshing cylinder 6 via the second class grain conveyor mechanism 79 and a second class reduction conveyor 81, and are re-threshed by the threshing cylinder 6. The straw wastes are discharged to the farm field from the dust exhaust port 73 in the rear portion of the travel machine body 1.

Figure 4:
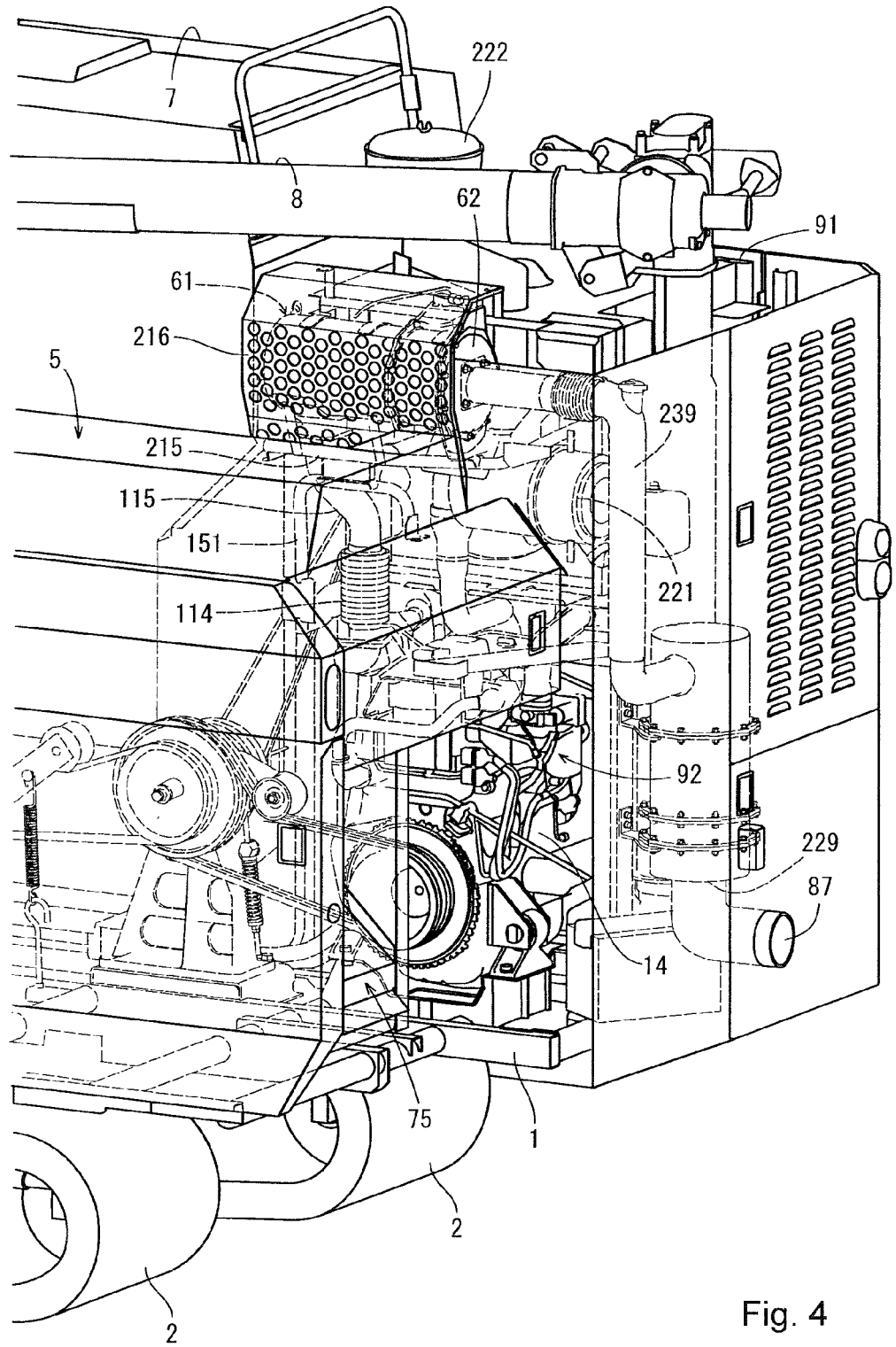
FIG. 4 is a perspective view of the general purpose combine harvester as seen from a rear side.
Figure 5:
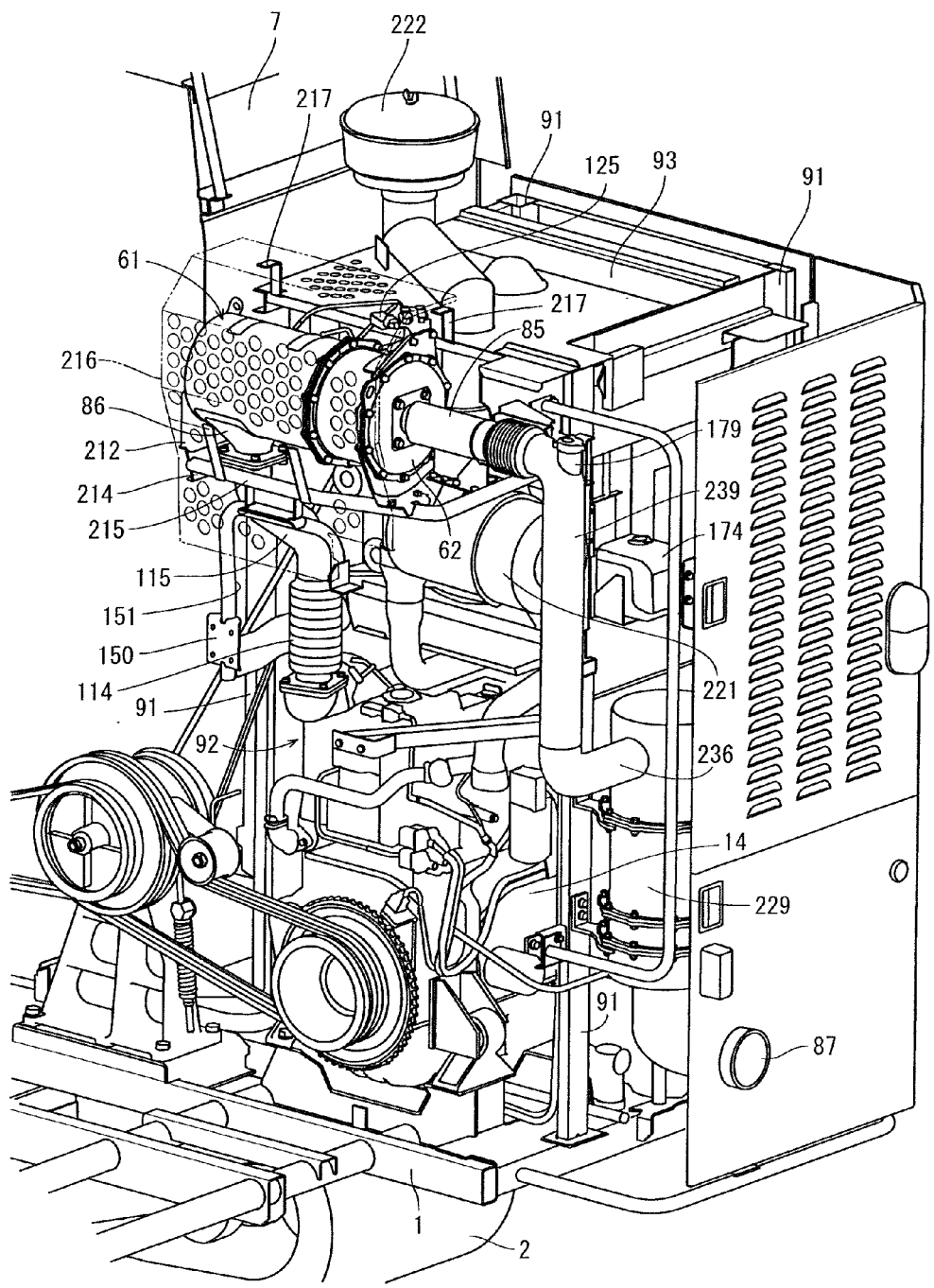
FIG. 5 is a perspective view when seeing an engine and an exhaust gas purification device from a back face side.
Figure 6:
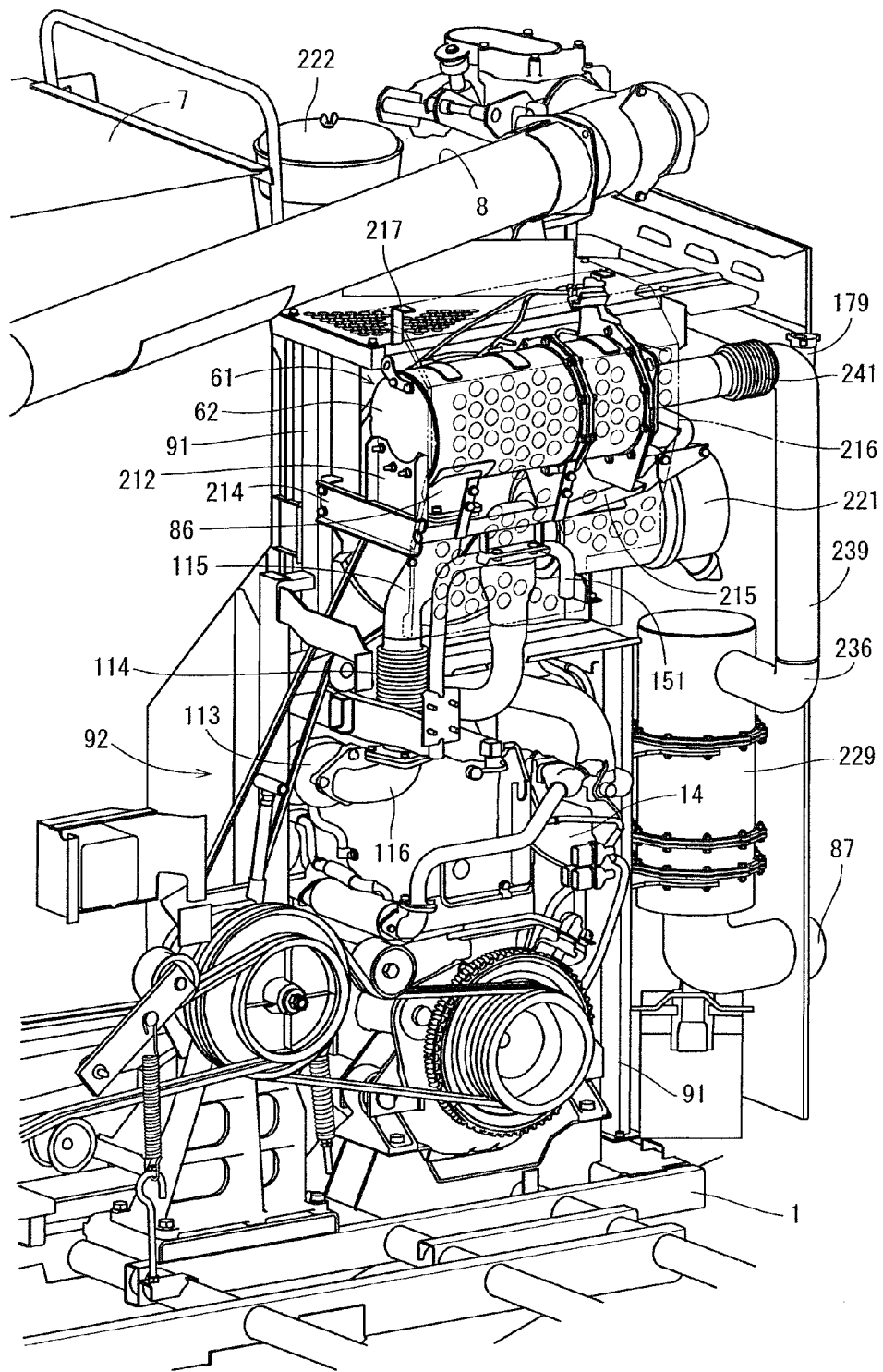
FIG. 6 is a perspective view when seeing the engine and the exhaust gas purification device from a front face side.
Figure 7:
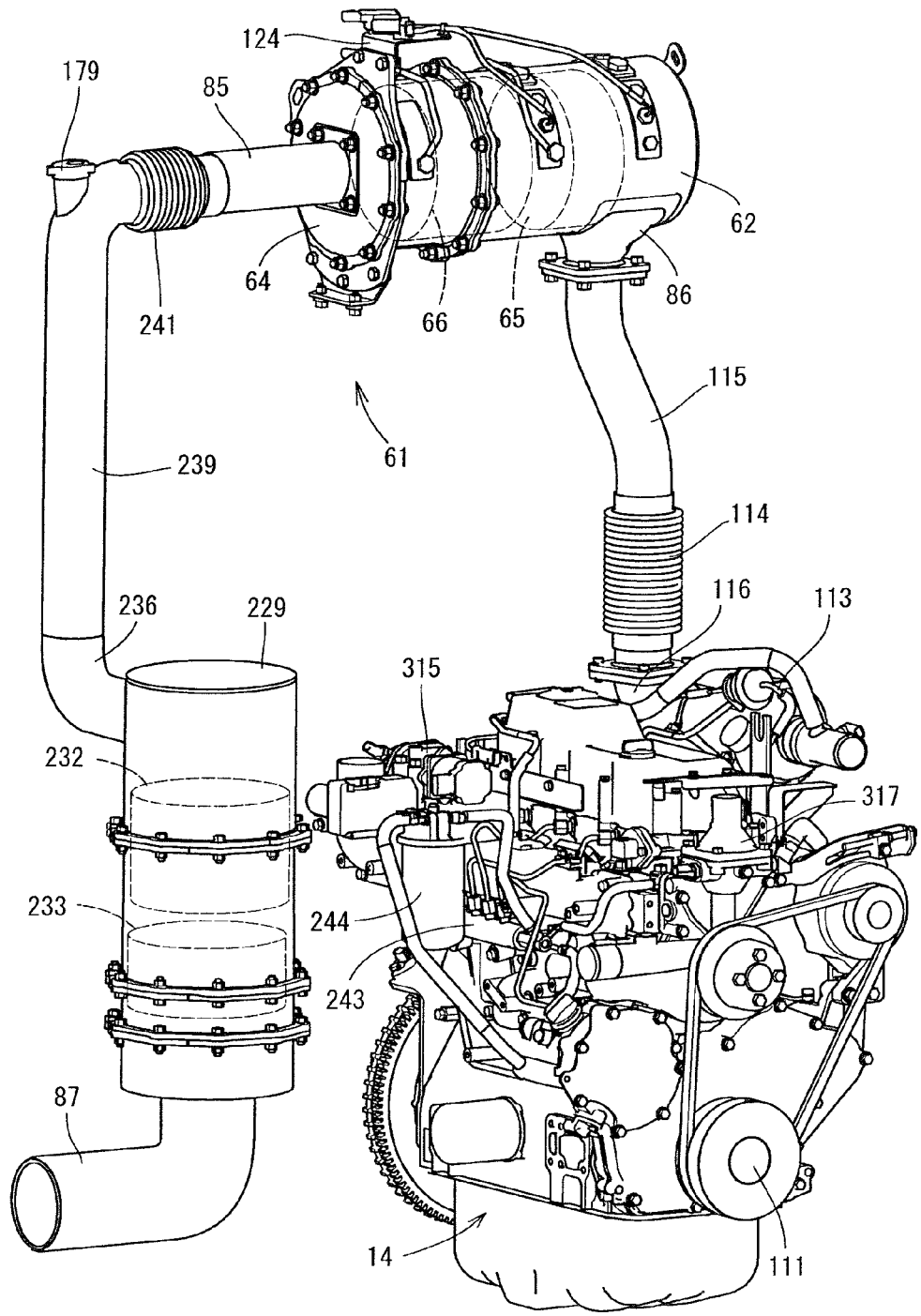
FIG. 7 is a perspective view of the engine and the exhaust gas purification device as seen from the back face side.
Figure 8:
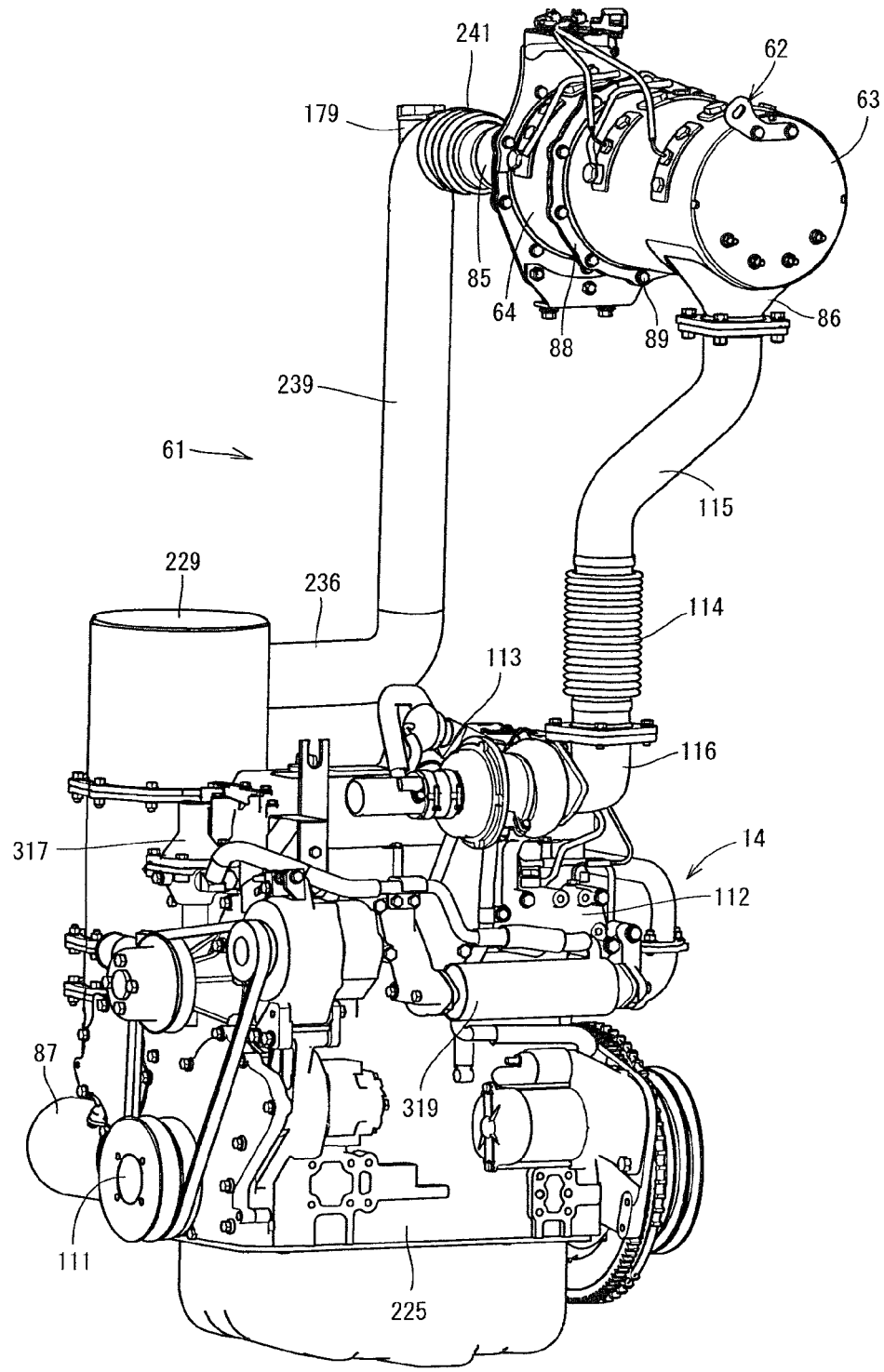
FIG. 8 is a perspective view of the engine and the exhaust gas purification device as seen from the front face side.

Next, a description will be given of the diesel engine 14, an exhaust gas purifying first case 62 serving as the exhaust gas purification device 61, and an attaching structure thereof, with reference to FIGS. 4 to 16. As shown in FIG. 5, the exhaust gas purification device 61 is provided with the continuous regeneration type first case 62 which introduces the exhaust gas of the diesel engine 14. The first case 62 has an inlet side case 63 and an outlet side case 64.

Further, a diesel oxidation catalyst 65 (the gas purification body) such as platinum and a soot filter 66 (the gas purification body) are arranged in an inner portion of the inlet side case 63 and the outlet side case 64 so as to be in series in a moving direction of the exhaust gas, the diesel oxidation catalyst 65 producing nitrogen dioxide ($NO_2$), and the soot filter 66 continuously oxidizing and removing collected particulate matters (PM) at a comparatively low temperature and having a honeycomb structure. The diesel oxidation catalyst 65 and the soot filter 66 embedded in the inlet side case 63 and the outlet side case 64 are structured such as to reduce carbon monoxide (CO) and carbon hydride (HC) in the exhaust gas, in addition to the removal of the particulate matters (PM) in the exhaust gas of the diesel engine 14.

Further, as shown in FIGS. 7 to 10, a purification inlet pipe 86 serving as an exhaust gas inlet pipe is fixed by welding to the inlet side case 63, and the outlet side case 64 is communicated and connected with an urea mixing pipe 239, a second case 229 and a tail pipe 87 mentioned later. The exhaust gas of the diesel engine 14 is introduced into the first case 62 from the purification inlet pipe 86, and the exhaust gas within the first case 62 is discharged externally from the tail pipe 87 via the urea mixing pipe 239 and the second case 229. The inlet side case 63 and the outlet side case 64 are detachably fastened by plural sets of thick plate-like intermediate flange bodies 88 and a plurality of bolts 89.

According to the structure mentioned above, the nitrogen dioxide ($NO_2$) created by the oxidation action of the diesel oxidation catalyst 65 is supplied into the soot filter 66 from one side end surface (an intake side end surface). The particulate matters (PM) included in the exhaust gas of the diesel engine 14 are collected by the soot filter 66, and are continuously oxidized and removed by the nitrogen dioxide (NO₂). In addition to the removal of the particulate matters (PM) in the exhaust gas of the diesel engine 14, the contents of the carbon monoxide (CO) and the carbon hydride (HC) in the exhaust gas of the diesel engine 14 are reduced.

Next, as shown in FIGS. 4 to 6 and 11 to 16, an engine room frame 91 serving as a machine body frame is provided in a rising manner on the travel machine body 1 in the rear of the cereal grain tank 7, and an engine room 92 is formed by the engine room frame 91. The diesel engine 14 is mounted to an upper face side of the travel machine body 1, the diesel engine 14 is inward provided in a lower side of an inner portion of the engine room 92, and a water cooling radiator 93 and a cooling fan 94 are inward provided in an upper side of the diesel engine 14 in the inner portion of the engine room 92. In other words, the diesel engine 14 and the water cooling radiator 93 of the diesel engine 14 are arranged as a vertically two-stage structure in the inner portion of the vertically long shaped engine room 92. The cooling fan 94 is arranged in a left side of the water cooling radiator 93, and the outside air is sucked from the right outer side of the combine harvester machine body toward the radiator 93 by the cooling fan 94. Meanwhile, the warm air of the radiator 93 is discharged toward the threshing device 5 side by the cooling fan 94.

Further, a right side, a back face side and an upper face side of the diesel engine 14 and the water cooling radiator 93 are surrounded by the engine room frame 91, and the water cooling outside air is taken into the inner portion of the engine room 92 from the right outer side of the engine room frame 91. Meanwhile, the warm air after cooling the diesel engine 14 and the water cooling radiator 93 is discharged toward the threshing device 5 serving as a working portion which is adjacent to the engine room frame 91 (the engine room 92).

Next, as shown in FIGS. 4 to 16, the first case 62 (the exhaust gas purification device 61) is arranged in an upper side portion of the engine room 92 which faces to the threshing device 5. As shown in FIGS. 5, 6, 11 and 16, a mounting table frame 211 is formed in a left side surface of the upper portion of the engine room 92 close to the threshing device 5, the mounting table frame 211 serving as a first case support body to which the first case 62 is supported. A front support frame body 212 and a rear support frame body 213 are arranged in the mounting table frame 211 so as to serve as a plurality of upward mounted fixing devices at intervals in an exhaust gas moving direction. The first case 62 is arranged in adjacent to the threshing device 5 via the front support frame body 212 and the rear support frame body 213, and the purification inlet pipe 86 is opened downward in a lower surface side of the first case 62. The first case 62 is assembled from the upward side of the engine room 92 in the front support frame body 212 and the rear support frame body 213 by suspending the exhaust gas purification device 61 to a material handling device such as a chain block or a hoist, and the cylindrical first case 62 is upward mounted and firmly fixed to the mounting table frame 211 in a transverse posture (a back-and-forth directing posture) so that the exhaust gas moving direction of the first case 62 is parallel to the right side surface of the threshing device 5.

As shown in FIGS. 4 to 6 and 11 to 16, there are provided a front upper face frame 214 which is horizontally protruded toward the right side surface of the threshing device 5 from the engine room frame 91 in the front side of the engine room 92 and is formed into a C-shaped end surface, and an exhaust gas purification frame 215 which is connected its front end side to a right end portion of the front upper face frame 214. The mounting table frame 211 serving as the first case support body is formed by the front support frame body 212, the rear support frame body 213, and the front upper face frame 214 and the exhaust gas purification frame 215 which form a part of the engine room frame 91. A rear end side of the exhaust gas purification frame 215 is firmly fixed to the engine room frame 91 in the rear side of the engine room 92, and the exhaust gas purification frame 215 is extended toward the back-and-forth direction so as to be parallel to the right side surface of the threshing device 5. The first case 62 is surrounded by the diesel engine 14 installing portion (the engine room 92) and the threshing device 5, thereby structuring such as to prevent a worker from being in contact with the first case 62 which becomes high temperature.

As shown in FIGS. 4 to 6 and 11 to 16, a front support bracket 134 is fixed by welding to the engine room frame 91 in the front face side of the engine room 92, and a right end portion of the front upper face frame 214 is fastened by bolts to the front support bracket 134. A front end portion of the exhaust gas purification frame 215 is fixed by welding to a left end portion of the front upper face frame 214 which is extended horizontally in a lateral direction, and the exhaust gas purification frame 215 is extended toward a rear side in parallel to the right side surface of the threshing device 5. An intermediate support bracket 136 is fixed by welding to an intermediate portion of the exhaust gas purification frame 215 which is parallel to the right side surface of the threshing device 5, and the rear support frame body 213 is fastened by bolts 133 to the upper face side of the intermediate support bracket 136. Front and rear lower cover brackets 218 are provided in a rising manner in the intermediate portion of the exhaust gas purification frame 215.

As shown in FIGS. 4 to 6, and 11 to 16, a rear support bracket 137 is fixed by welding to the engine room frame 91 in the rear surface side of the engine room 92, a seat plate body 138 is fixed by welding to a rear end portion of the exhaust gas purification frame 215, and the seat plate body 138 is fastened by bolts 139 to the rear support bracket 137. An upper face height of the engine room frame 91 is constructed as a multiple step shape by the front upper face frame 214 and the exhaust gas purification frame 215 which are protruded toward the right side surface of the threshing device 5 from the engine room frame 91. In other words, the upper face of the engine room 92 is formed by the front upper face frame 214 and the exhaust gas purification frame 215, at a position which is lower than a top surface of the engine room frame 91. In other words, a height of the upper face of the first case 62 mounted on the front upper face frame 214 and the exhaust gas purification frame 215 is structured such as to be the same or lower than the height of the top surface of the engine room frame 91.

Further, the front upper face frame 214 and the exhaust gas purification frame 215 are arranged at a position which is lower by a vertical width of the first case 62 than the top surface (a moving track of the exhaust auger 8), in the upper face of the engine room 92. The upper face of the engine room 92 is formed by the front upper face frame 214 and the exhaust gas purification frame 215 at a position which is approximately the same as the height of the top surface of the threshing device 5. In other words, the front upper face frame 214 and the exhaust gas purification frame 215 are arranged at a position which is lower by a vertical width of the first case 62 than the top surface (the moving track of the exhaust auger 8), in the upper face of the engine room 92. A height of the lower face of the first case 62 mounted on the front upper face frame 214 and the exhaust gas purification frame 215 is structured such as to be the same or higher than the height of the top surface of the engine room frame 91.

As mentioned above, the exhaust gas purification frame 215 serving as the sub room frame is protruded toward the threshing device 5 from the side face of the engine room frame 91, and the first case 62 is upward mounted and fixed to the exhaust gas purification frame 215. The exhaust gas purification device 61 is supported at a position which is lower than the top surface of the engine room frame 91, and a differential pressure sensor 125 serving as an exhaust gas detecting means attached to the first case 62 is structured such as to be supported at a position which is higher than the top surface of the engine room frame 91. The first case 62 is supported via the exhaust gas purification frame 215 at a position which is higher than the upper face of the threshing device 5 and lower than the top surface of the engine room frame 91, the installing portion of the first case 62 is formed at a position which is spaced from the diesel engine 14, within a range where the temperature of the exhaust gas supplied to the first case 62 does not lower (a self-regeneration capacity does not lower), and the first case 62 is assembled at a high position of the upper side surface portion of the engine room 92 which faces to the threshing device 5, thereby reducing an adverse effect that the periphery of the diesel engine 14 becomes high temperature by the radiated heat of the first case 62 when the diesel engine 14 is stopped.

As shown in FIGS. 11 to 18, supporting leg attaching bodies 150 are fixed by welding to gantry both end portions of a round pipe-shaped supporting leg frame 151, and the supporting leg attaching bodies 150 in the gantry both end portions of the supporting leg frame 151 are fastened by bolts 152 to the right side surface side of the threshing device 5 which faces to the engine room 92. An upper supporting leg bracket 153 is protruded toward a lower side from the exhaust gas purification frame 215. Meanwhile, a lower supporting leg bracket 154 is firmly fixed to a gantry intermediate portion of the supporting leg frame 151. A lower end side of the upper supporting leg bracket 153 is fastened by bolts 155 to the upper face side of the lower supporting leg bracket 154. An upper end side of the supporting leg frame 151 is connected from a lower side to an intermediate portion of the exhaust gas purification frame 215 which is extended in the back-and-forth direction, and the exhaust gas purification frame 215 is reinforced by the supporting leg frame 151 so that a rigidity of the intermediate portion of the exhaust gas purification frame 215 become higher.

Further, as shown in FIGS. 6 to 10, 15 and 16, the purification inlet pipe 86 serving as the exhaust gas intake port is provided in a downward directing posture in the lower surface side of the first case 62 in the exhaust gas supply side of the front end side of the first case 62, the purification inlet pipe 86 is open downward to the lower surface side of the first case 62, and the purification inlet pipe 86 is open toward the upper face side of the diesel engine 14. Further, an exhaust manifold 112 and a supercharger 113 are arranged in an upper portion in a front face side of the diesel engine 14 which is mounted to the travel machine body 1 in a state in which an output shaft 111 of the diesel engine 14 is directed in a lateral direction. An exhaust outlet pipe 116 of the supercharger 113 is open upward toward the purification inlet pipe 86 in a lower surface of the first case 62. One end side of an exhaust connection pipe 115 is connected to the purification inlet pipe 86. Meanwhile, the other end side of the exhaust connection pipe 115 is connected to the exhaust outlet pipe 116 of the supercharger 113 via a bendable bellows-like exhaust pipe 114.

According to the structure mentioned above, the first case 62 is communicated and connected with the exhaust manifold 112 via the supercharger 113 and the exhaust connection pipe 115. As shown in FIG. 4, in a right lateral side in the rear portion of the threshing device 5, the first case 62 which is long in the back-and-forth direction and is formed into a cylindrical shape (a transversely arranged posture) is arranged in a space which is formed in an upper face side of the engine room frame 91 closer to the right side surface of the threshing device 5. The exhaust gas of the diesel engine 14 is introduced into the inlet side case 63 of the first case 62 via the exhaust manifold 112, the supercharger 113, the exhaust outlet pipe 116, the bellows-like exhaust pipe 114, and the exhaust connection pipe 115. The exhaust gas of the diesel engine 14 moves to the soot filter 66 in the rear portion of the first case 62 from the diesel oxidation catalyst 65 in the front portion of the first case 62, moves toward a rear side portion of the threshing device 5 (the engine room 92), and is discharged to the atmosphere via the urea mixing pipe 239, the second case 229 and the tail pipe 87.

Further, the first case 62 is arranged in an upper side surface portion of the engine frame 91 close to the threshing device 5. In other words, the upper face of the first case 62 is formed lower than the lower surface of the discharge auger 8, and the lower surface of the first case 62 is formed higher than the upper face of the threshing device 5. The first case 62 is supported at a position which is lower than the lower surface of the discharge auger 8 at an accommodated position (a harvesting work posture). Therefore, the discharge auger 8 does not come into collision with the first case 62 and the like even if the discharge auger 8 is moved to any of the accommodated position or the grain discharge position in the externally lateral side. As a result, it is possible to easily swivel and move the discharge auger 8 to inner and outer sides of the machine body, in the grain discharging work of the cereal grain tank 7.

Figure 11:
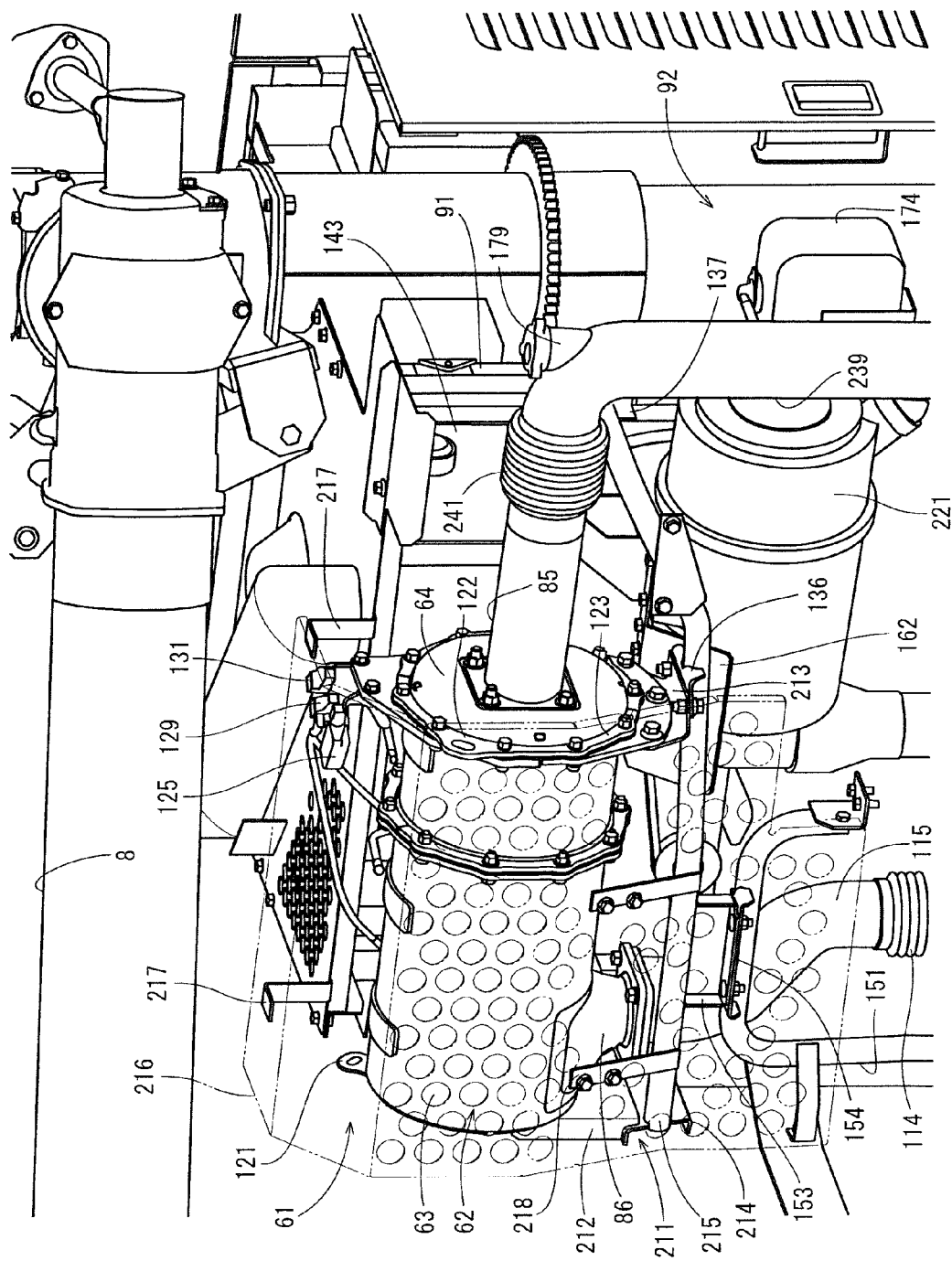
FIG. 11 is a perspective view as seen from a back face side of a first case portion.
Figure 12:
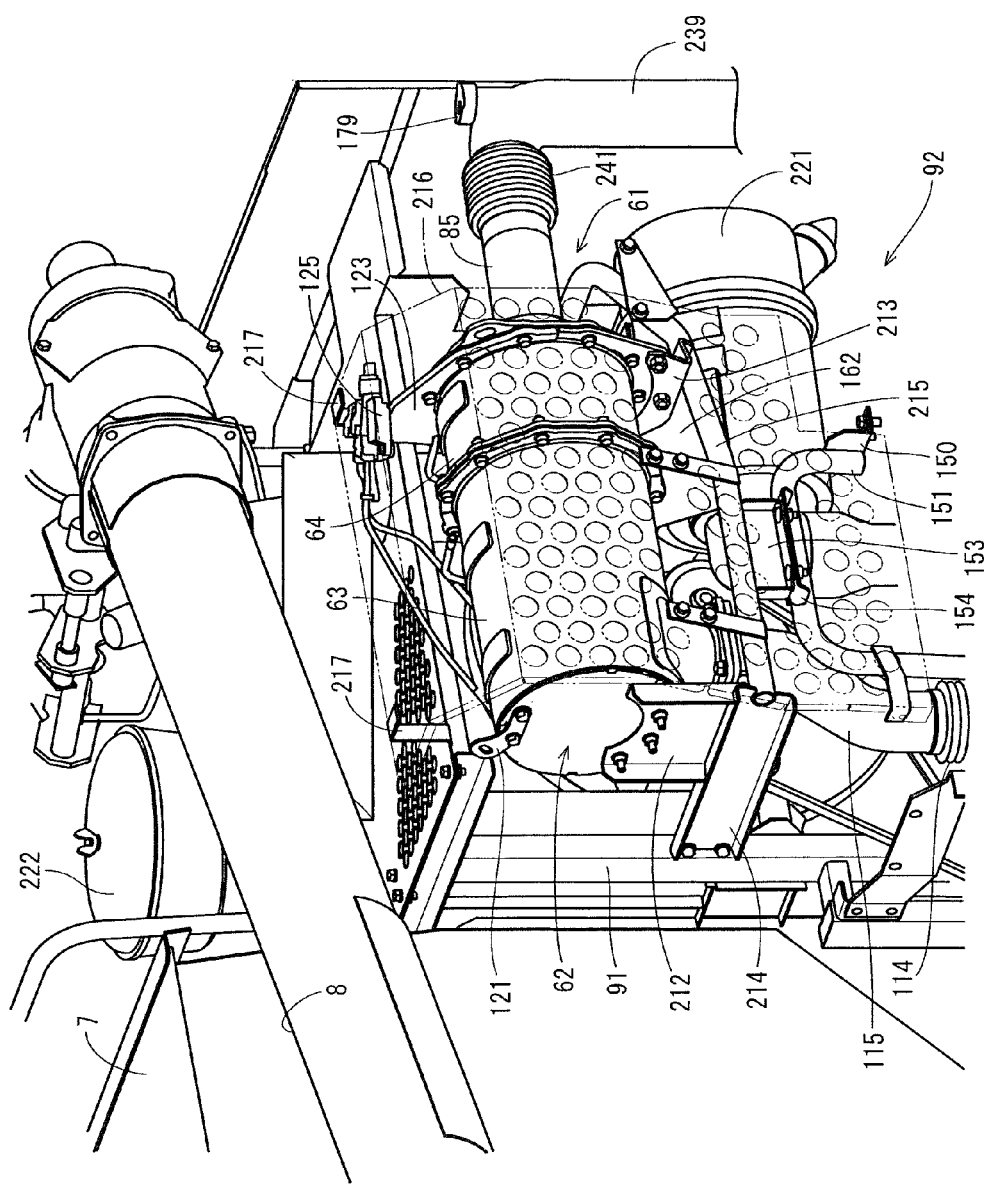
FIG. 12 is a perspective view as seen from a front face side of the first case portion.
Figure 13:
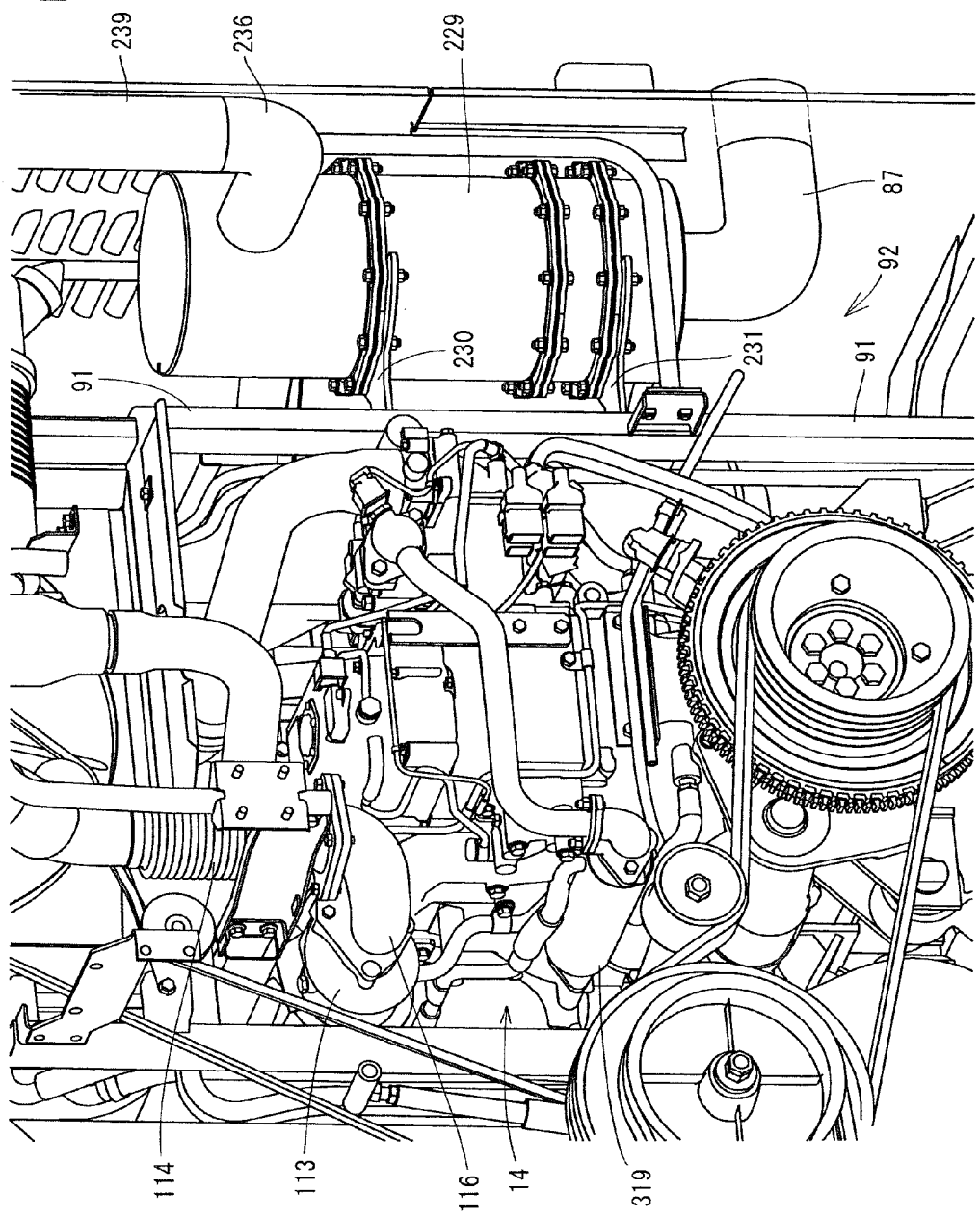
FIG. 13 is a perspective view as seen from a front face side of a second case portion.
Figure 14:
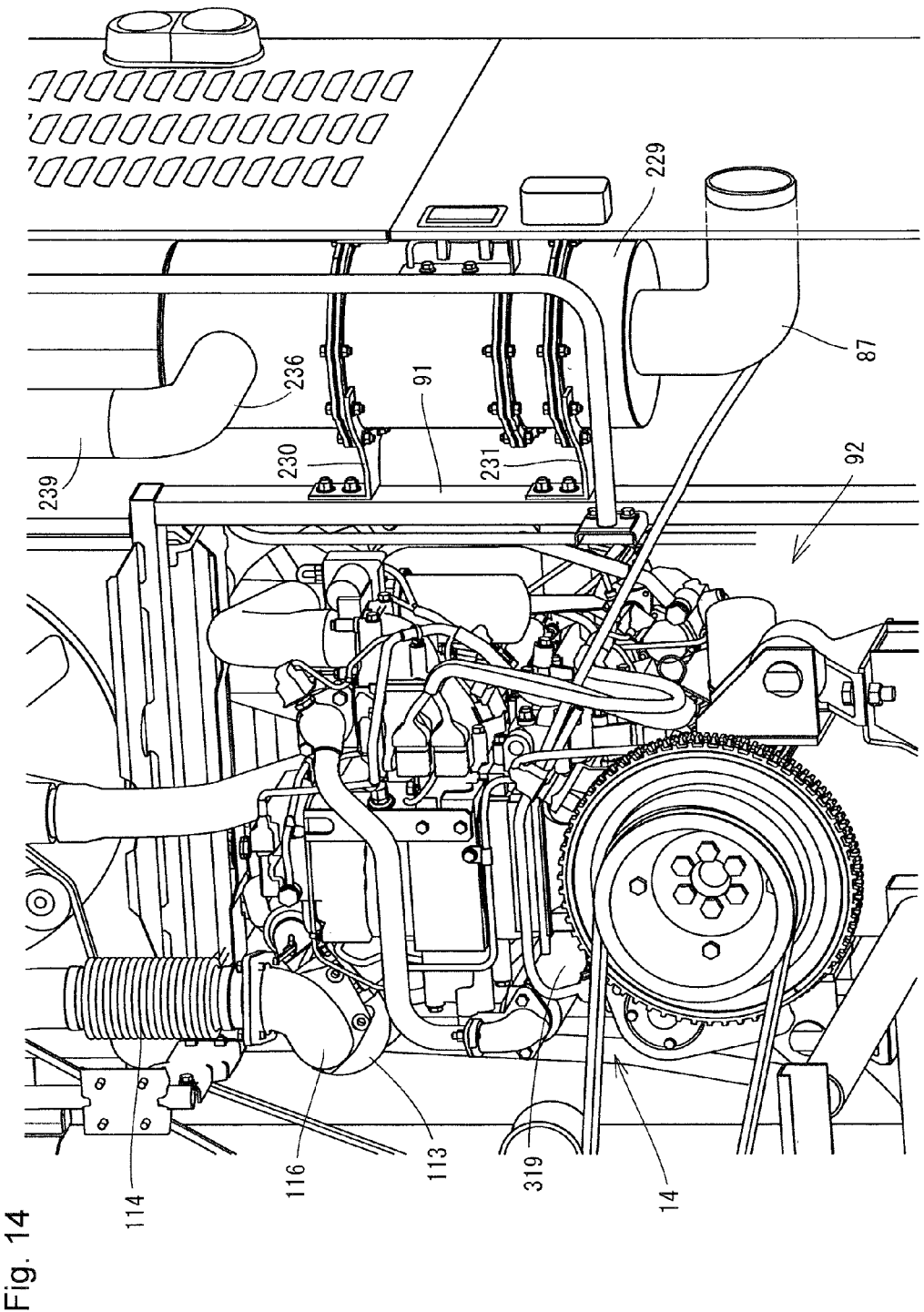
FIG. 14 is a perspective view as seen from a back face side of the second case portion.
Figure 15:
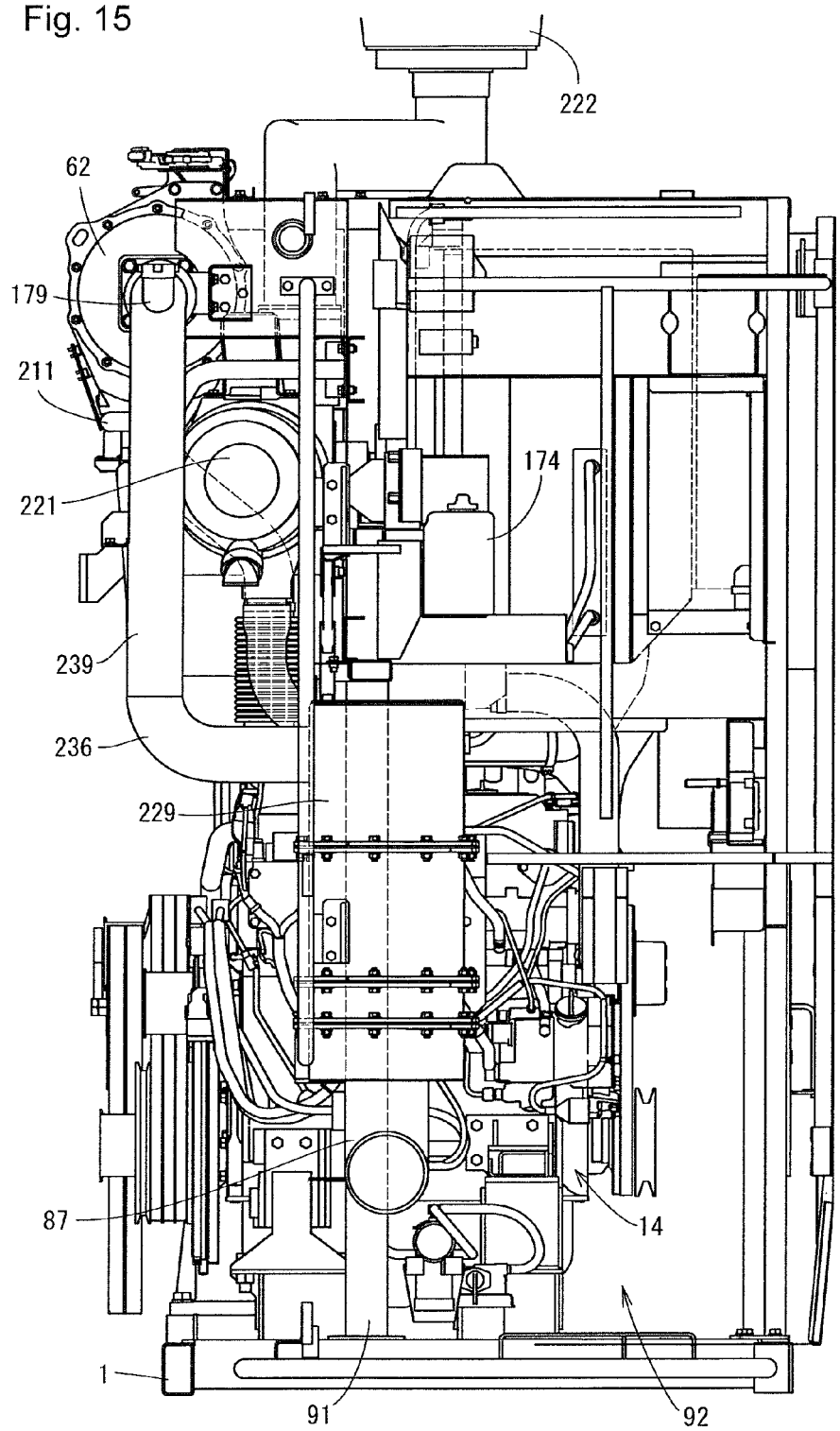
FIG. 15 is a back face view of the engine and the exhaust gas purification device.
Figure 17:
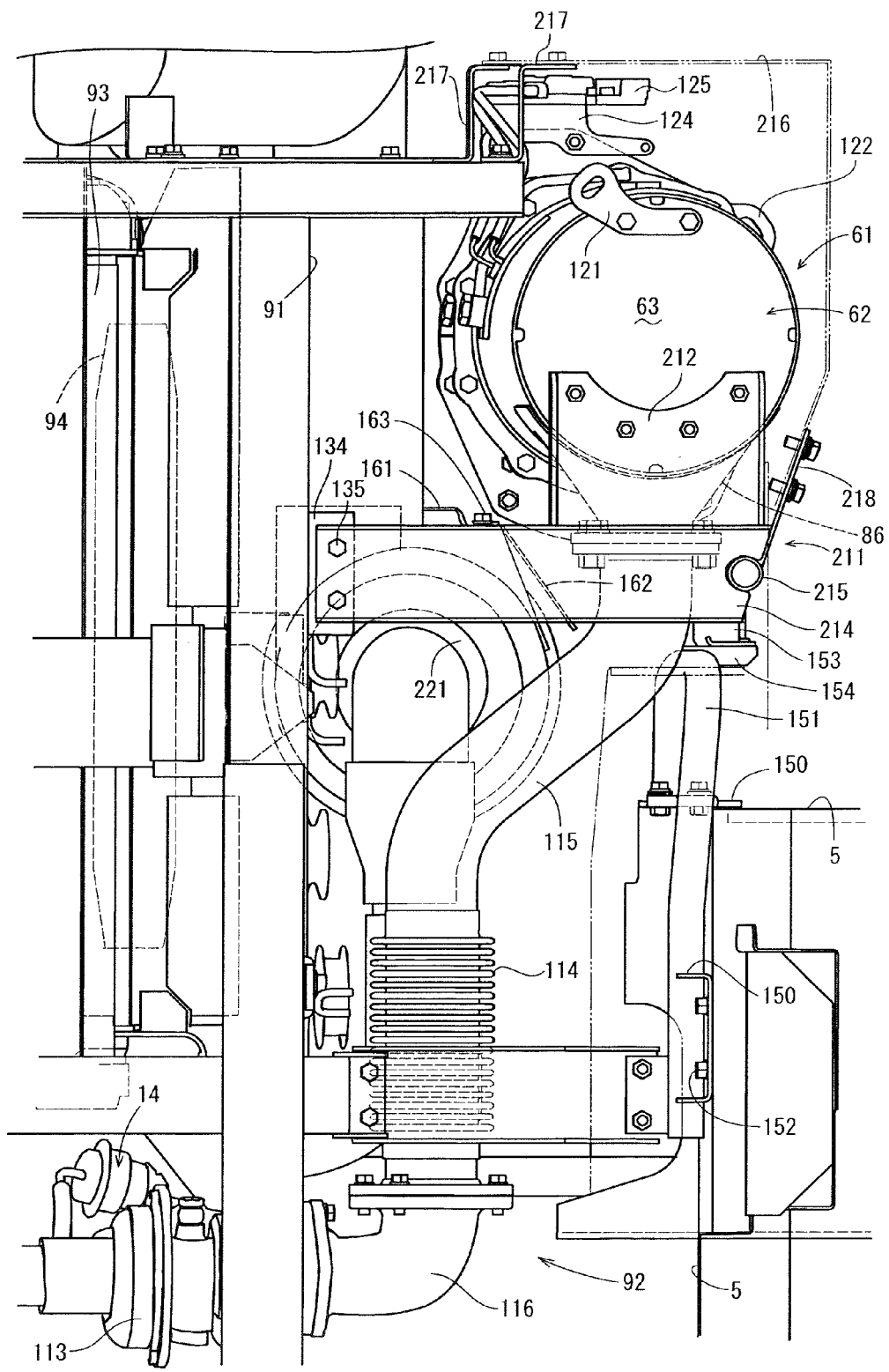
FIG. 17 is a front face view of the first case portion.
Figure 19:
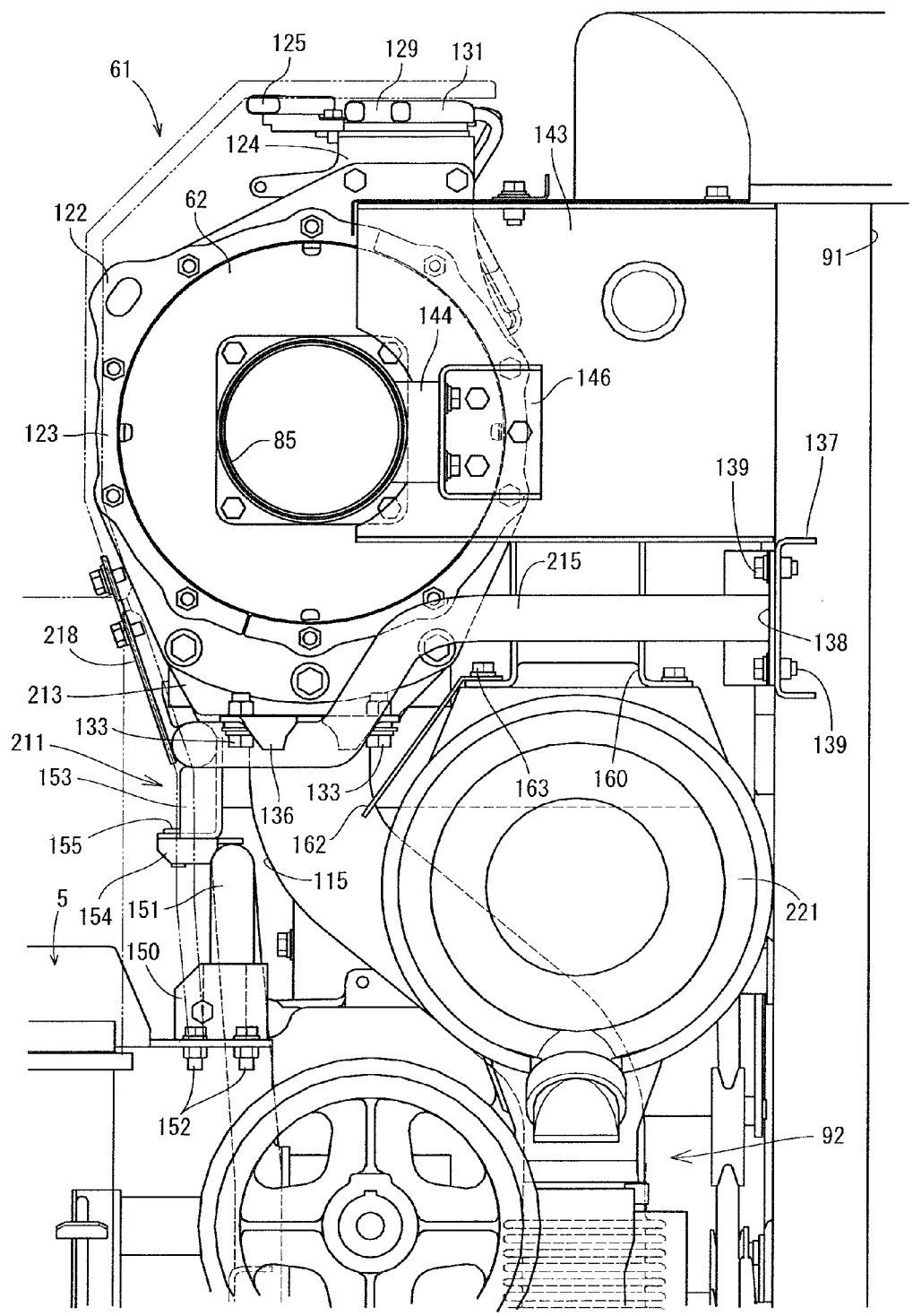
FIG. 19 is a back face view of the same.

Meanwhile, as shown in FIGS. 11, 17 and 19, front and rear suspension bracket bodies 121 and 122 are respectively provided in the front face side and the rear face side of the first case 62. Therefore, the first case 62 can be suspended to the chain block and the like via the suspension bracket bodies 121 and 122 by locking the suspension bracket bodies 121 and 122 to the suspension hook of the material handling device, for example, the chain block or the hoist, in the assembly plant of the combine harvester, and it is possible to easily execute an attaching or detaching work of the heavy first case 62. The suspension bracket body 122 is integrally formed in a thick plate-like rear end flange body 123 for connecting a purification outlet pipe 85 to the rear end side of the first case 62.

Further, a sensor bracket 124 is fastened by bolts to the thick plate-like rear end flange body 123, and the sensor bracket 124 is provided in a protruding manner in the upper face side of the outlet side case 64 in the rear end side of the first case 62. The sensor bracket 124 is arranged in the upper face side of the rear end portion of the first case 62. A differential pressure sensor 125 integrally provided with an electric wiring connector is attached to a flat upper face of the sensor bracket 124. The differential pressure sensor 125 is arranged in the outer side surface of the first case 62.

Each of one end sides of an upstream side sensor piping and a downstream side sensor piping (not shown) is connected to the differential pressure sensor 125. The other end side of each of the sensor pipings in the upstream side and the downstream side is connected to respective sensor piping boss bodies in the upstream side and the downstream side which are arranged in the first case 62, in such a manner as to pinch the soot filter 66 within the first case 62.

Therefore, a difference (a differential pressure of the exhaust gas) between the exhaust gas pressure in the inflow side of the soot filter 66 and the exhaust gas pressure in the outflow side of the soot filter 66 is detected via the differential pressure sensor 125. Since a residual volume of the particulate matters in the exhaust gas collected by the soot filter 66 is in proportion to the differential pressure of the exhaust gas, it is possible to execute a regeneration control (for example, a control for raising the exhaust gas temperature) which reduces an amount of the particulate matters of the soot filter 66, or an alarm display, on the basis of results of detection of the differential pressure sensor 125, in the case that the amount of the particulate matters remaining in the soot filter 66 is increased to a predetermined amount or more.

Further, there are provided an upstream side gas temperature sensor 128 which detects a temperature of the exhaust gas in an exhaust gas intake side of the diesel oxidation catalyst 65, and a downstream side gas temperature sensor 130 which detects a temperature of the exhaust gas in an exhaust gas discharge side of the diesel oxidation catalyst 65, and an electric wiring connector 129 of the upstream side gas temperature sensor 128 and an electric wiring connector 131 of the downstream side gas temperature sensor 130 are firmly fixed to the sensor bracket 124. On the basis of results of detection of the exhaust gas temperature in the inner portion of the first case 62 (outputs of the respective sensors 128 and 130), an advisability or an alarm display is executed.

Further, there is provided a purification device cover body 216 which covers the upper face and the right side surface of the first case 62. In the purification device cover body 216, a lot of holes are open to a side surface portion thereof. A back-and-forth upper cover bracket 217 is provided in the top surface of the engine room frame 91, and a back-and-forth lower cover bracket 218 is provided in the exhaust gas purification frame 215. The purification device cover body 216 is detachably fastened to the upper cover bracket 217 and the lower cover bracket 218. The first case 62 and the differential pressure sensor 125 are protected by the purification device cover body 216 while taking into consideration ventilation around the first case 62.

As shown in FIGS. 1 and 11 to 16, in the combine harvester in which the engine room frame 91 is provided in the threshing device 5 side by side, the diesel engine 14 is inward provided in the engine room 92 which is formed by the engine room frame 91, the first case 62 processing the exhaust gas of the diesel engine 14 is provided, and the first case 62 is connected to the exhaust outlet pipe 116 serving as the exhaust pipe of the diesel engine 14, the mounting table frame 211 serving as the sub room frame is provided so as to protrude toward the threshing device 5 from the side surface of the engine room frame 91, and the first case 62 is mounted and fixed to the upper side of the mounting table frame 211. Therefore, the first case 62 can be assembled at a high position of the upper side surface of the engine room 92 via the mounting table frame 211. It is possible to easily secure the installing space of the first case 62 by adding the mounting table frame 211 at the high position of the outer side surface of the engine room 92, and a volumetric capacity of the engine room 92 or a volumetric capacity of the first case 62 is not restricted. Further, the first case 62 corresponding to the heavy part can be suspended and assembled to the material handling device such as the chain block or the hoist by opening the upper side of the mounting table frame 211 widely, it is possible to easily execute the attaching or detaching work of the first case 62, and it is possible to improve an attaching and detaching workability of the first case 62.

Further, as shown in FIGS. 11 to 19, there are provided an air cleaner 221 which supplies outside air to the diesel engine 14, and a pre-cleaner 222 which sucks the outside air to the air cleaner 221. The pre-cleaner 222 is arranged in the rear surface side of the cereal grain tank 7 in the upper face of the engine room 92. The air cleaner 221 is arranged between the upper face side of the diesel engine 14 and the lower face side of the exhaust gas purification device 61. The air for combustion is structured such as to be sucked into the intake manifold of the diesel engine 14 from the pre-cleaner 222 via the air cleaner 221.

As shown in FIGS. 11 to 19, a suspension frame 161 is provided so as to protrude downward from a back face cover plate body 143 which is firmly fixed to the engine room frame 91, and an upper face side of the air cleaner 221 is connected to a lower end side of the suspension frame 161. The air cleaner 221 is suspended and supported via the suspension frame 161, the exhaust gas purification device 61 is arranged at the high position of the engine room 92, and the air cleaner 221 is installed between the upper face of the diesel engine 14 and the lower face of the exhaust gas purification device 61.

Figure 18:
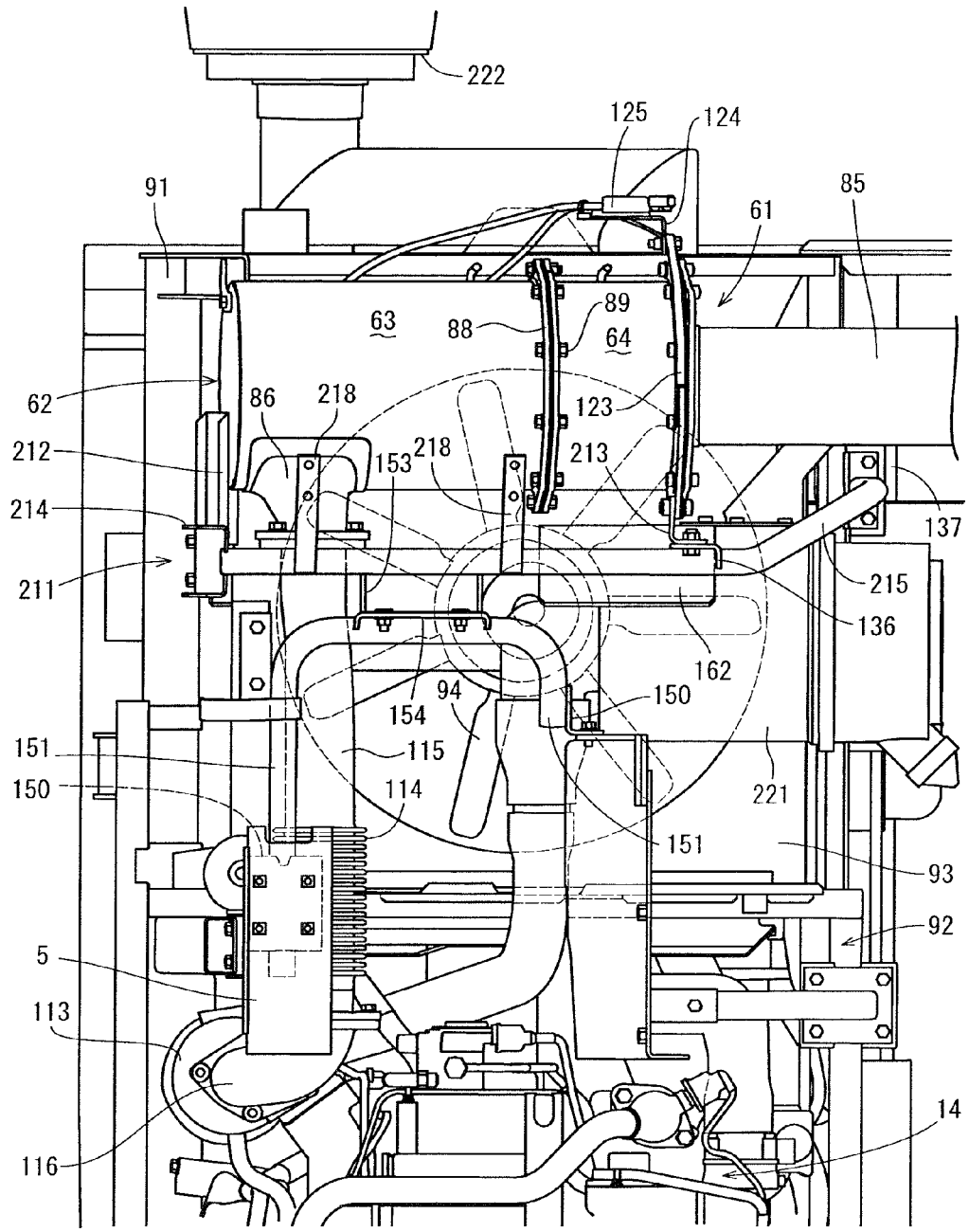
FIG. 18 is a left side elevational view of the same.

As shown in FIGS. 17 to 19, the first case 62 (the exhaust gas purification device 61) is arranged in an upward side of the exhaust gas purification frame 215, and the air cleaner 221 is arranged in a lower side of the exhaust gas purification frame 215, across the exhaust gas purification frame 215. A rear end side of the first case 62 and a front end side of the air cleaner 221 are faced vertically with a predetermined distance, and the first case 62 and the air cleaner 221 are structured such as to be supported approximately in parallel to one side portion of the engine room 92 while being overlapped vertically in the rear portion and the front portion.

Further, a heat shield plate 162 is arranged at a position where the first case 62 and the air cleaner 221 are overlapped vertically, between the first case 62 (the exhaust gas purification device 61) and the air cleaner 221. One end side of the heat shield plate 162 is firmly fixed to an upper face side of the air cleaner 221 via bolts 163 which fasten the upper face side of the air cleaner 221 to the lower end side of the suspension frame 161. The other end side of the heat shield plate 162 is extended between the first case 62 and the air cleaner 221 from the upper face side of the air cleaner 221. Heat (radiant heat) generated in the first case 62 side is shielded by the heat shield plate 162, thereby preventing the air cleaner 221 from being damaged and deformed by the generated heat (the radiant heat) in the first case 62 side.

Next, as shown in FIGS. 7 to 10, 15 and 16, as the exhaust gas purification device 61 for purifying the exhaust gas discharged from each of the cylinders of the diesel engine 1, there are provided the first case 62 serving as a diesel particulate filter (DPF) which removes the particulate matter in the exhaust gas of the diesel engine 1, and the second case 229 serving as an urea selective catalyst reduction (SCR) system which removes the nitrogen oxide in the exhaust gas of the diesel engine 1. As described above, the oxidation catalyst 65 and the soot filter 66 are inward provided in the first case 62. Meanwhile, an SCR catalyst 232 for the urea selective catalyst reduction and an oxidation catalyst 233 are inward provided in the second case 229.

The first case 62 is constructed as a horizontally long cylindrical shape which extends longer in the back-and-forth direction, and the second case 229 is constructed as the vertically long cylindrical shape which extends longer in the vertical direction. An SCR inlet pipe 236 taking the exhaust gas therein and the tail pipe 87 serving as an SCR outlet pipe discharging the exhaust gas are provided in respective sides (one end side and the other end side in the exhaust gas moving direction) of the second case 229.

Further, the exhaust gas of the diesel engine 14 is introduced into the first case 62. Meanwhile, the exhaust gas of the first case 62 is introduced into the second case 229 by connecting the SCR inlet pipe 236 to the purification outlet pipe 85 of the first case 62 via the urea mixing pipe 239. The urea water supplied into the urea mixing pipe 239 is mixed as the ammonia into the exhaust gas leading to the second case 229 from the first case 62.

Further, as shown in FIGS. 15 to 19, the purification inlet pipe 86 serving as the exhaust gas inlet pipe is fixed by welding to the inlet side case 63, and one end side of the purification outlet pipe 85 serving as the exhaust gas outlet pipe is fastened by bolts to the outlet side case 64. One end side of the urea mixing pipe 239 (the exhaust pipe) mentioned later is connected to the other end side of the purification outlet pipe 85. The exhaust gas of the diesel engine 14 is introduced into the first case 62 from the purification inlet pipe 86, and the exhaust gas within the first case 62 is discharged to the urea mixing pipe 239 from the purification outlet pipe 85.

Meanwhile, as shown in FIG. 19, a pipe support table 146 is fastened by bolts to a rear face side of the back face cover plate body 143, a pipe support bracket 144 is detachably fastened by bolts to the pipe support table 146, the pipe support bracket 144 is fixed by welding to the purification outlet pipe 85 of the first case 62, and the purification outlet pipe 85 of the first case 62 is supported by the pipe support bracket 144. In addition, the urea mixing pipe 239 is extended over a rear face side of the engine room 92 from a left side of the engine room 92 in which the first case 62 is arranged. Further, the urea mixing pipe 239 is formed as being folded into an L-shaped form, the exhaust gas inlet of the urea mixing pipe 239 is connected to the purification outlet pipe 85 via a bellows-like connection pipe 241 which can be folded and extended and contracted, the SCR inlet pipe 236 is connected to the exhaust gas outlet of the urea mixing pipe 239, and the second case 229 arranged in the rear face side of the engine room 92 is communicated with the first case 61 arranged in the left side surface side of the engine room 92 via the urea mixing pipe 239.

Figure 9:
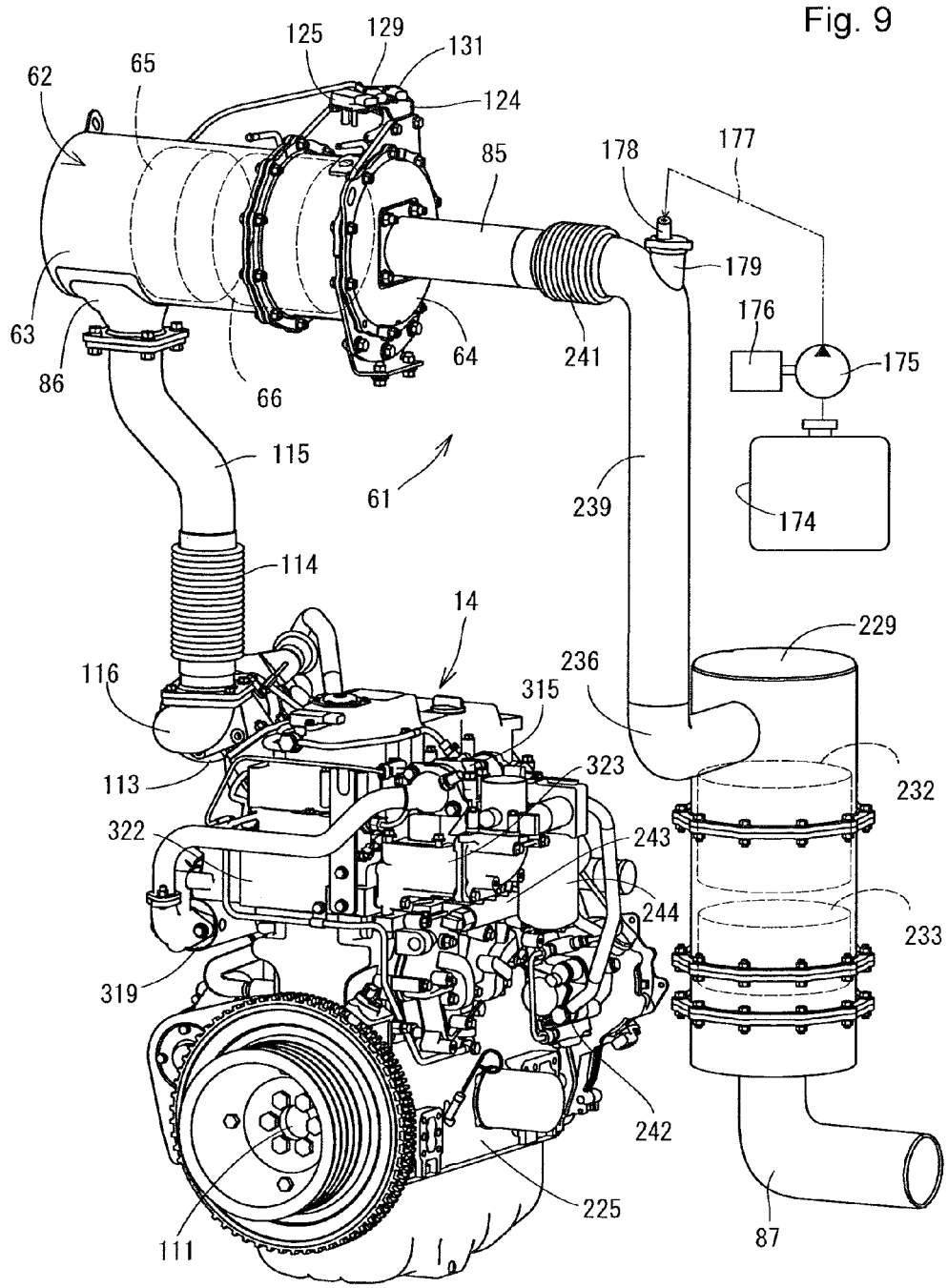
FIG. 9 is a perspective view of the engine and the exhaust gas purification device as seen from a left rear side.
Figure 10:
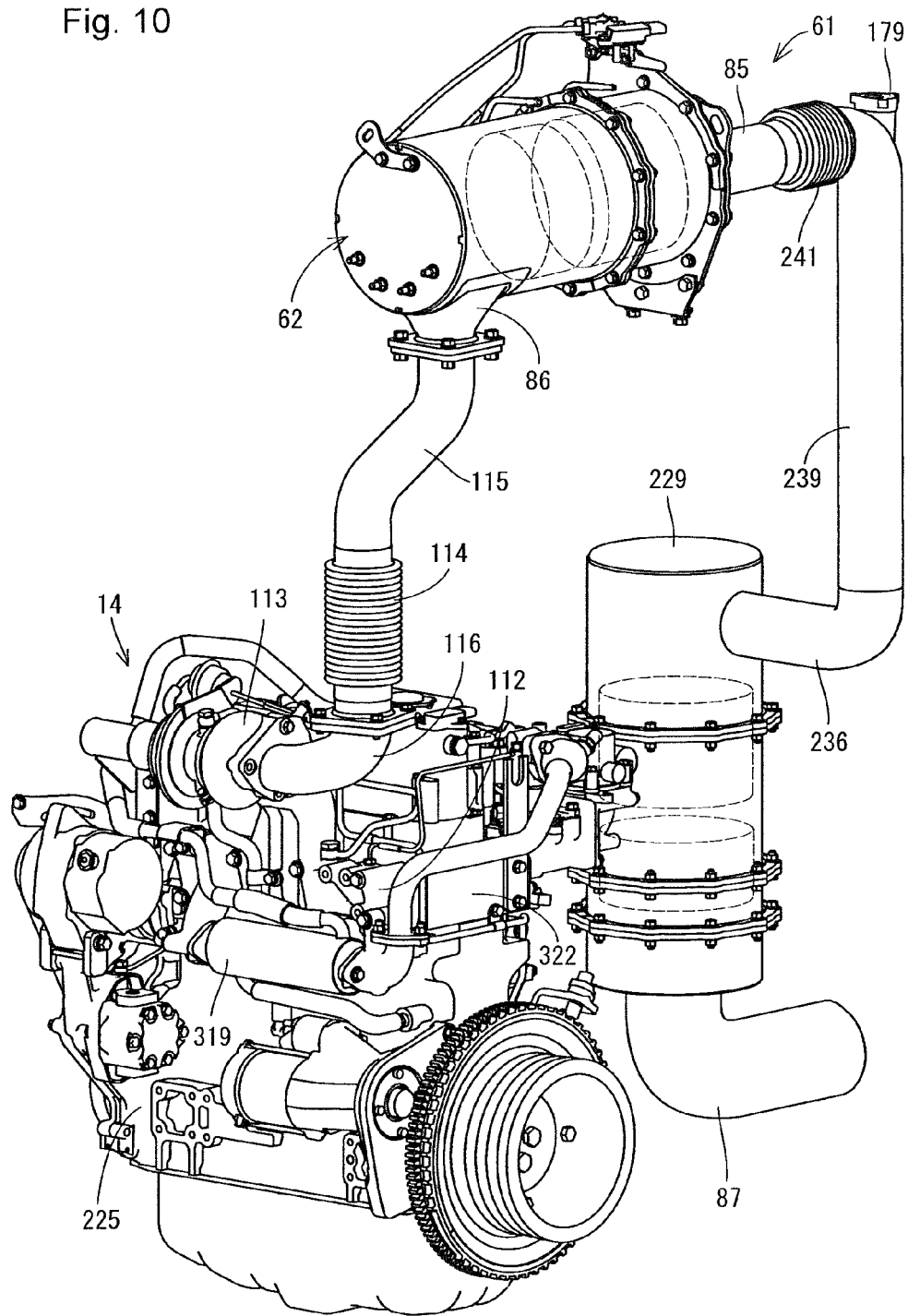
FIG. 10 is a perspective view of the engine and the exhaust gas purification device as seen from a left front side.

Further, as shown in FIG. 9, there are provided an urea water injection pump 175 which pressure feeds urea aqueous solution within an urea water tank 174 mounted to the travel machine body 1, an electric motor 176 which drives the urea water injection pump 175, and an urea water injection nozzle 178 which is connected to the urea water injection pump 175 via an urea water injection pipe 177. The urea water injection nozzle 178 is attached to the urea mixing pipe 239 via an injection pedestal 179, and the urea aqueous solution is sprayed into an inner portion of the urea mixing pipe 239 from the urea water injection nozzle 178. The urea water supplied into the urea mixing pipe 239 is mixed as the ammonia with the exhaust gas leading to the second case 229 from the first case 62.

The exhaust gas discharged to the exhaust manifold 112 from each of the cylinders of the diesel engine 14 is discharged to an external portion via the exhaust gas purification device 61. The exhaust gas purification device 61 is structured such as to reduce the carbon monoxide (CO), the carbon hydride (HC), the particulate matter (PM) and the nitrogen oxide (NOx) in the exhaust gas of the diesel engine 14.

Meanwhile, as shown in FIGS. 7 to 10, an intake manifold 323 is installed to a right side surface of a cylinder head 322 in the side surfaces of the diesel engine 14. An exhaust gas recirculation device (EGR) 315 taking the exhaust gas for recirculation therein is arranged in the intake manifold 323. The air cleaner (not shown) is connected to the intake manifold 323. The external air dust removed and purified by the air cleaner 221 is fed to the intake manifold 323, and supplied to each of the cylinders of the diesel engine 14. The exhaust manifold 112 is installed to a left side surface of the cylinder head 322 in the side surfaces of the diesel engine 14.

According to the structure mentioned above, since a part of the exhaust gas discharged out of the diesel engine 14 to the exhaust manifold 112 is flowed back to each of the cylinders of the diesel engine 14 from the intake manifold 323 via the exhaust gas recirculation device 315, the combustion temperature of the diesel engine 14 decreases, the discharge amount of the nitrogen oxide (NOx) from the diesel engine 14 is reduced, and the fuel consumption of the diesel engine 14 is improved.

There is provided a cooling water pump 317 which circulates the cooling water within a cylinder block 225 and to the radiator 93. The cooling water pump 317 is driven to feed the cooling water into the cylinder block 225 from the cooling water pump 317 via an EGR cooler 319 in the exhaust gas recirculation device 315. The cooling water pump 317 is connected to an engine output shaft of the diesel engine 14 via a V-belt or the like.

As shown in FIGS. 7 to 10, there are provided a fuel pump 242 and a common rail 243 which connect a fuel tank (not shown) mounted to the travel machine body 1 to each of injectors (not shown) for multiple cylinders of the diesel engine 14. The common rail 243 and a fuel filter 244 are arranged in a side surface in an installation side of the intake manifold 323 in a right side surface of the cylinder head 322, among the side surfaces of the diesel engine 14, and the fuel pump 242 is arranged in the cylinder block 225 below the intake manifold 323. Each of the injectors has an electromagnetic opening and closing control type fuel injection valve (not shown).

The fuel within the fuel tank is sucked into the fuel pump 242 via the fuel filter 244, the common rail 243 is connected to a discharge side of the fuel pump 242, and the cylindrical common rail 243 is connected to each of the injectors of the diesel engine 14. Surplus of the fuel pressure fed to the common rail 243 from the fuel pump 242 is returned to the fuel tank, the high-pressure fuel is temporarily stored within the common rail 243, and the high-pressure fuel within the common rail 243 is supplied to an inner portion of each of the cylinders of the diesel engine 14.

According to the structure mentioned above, the fuel in the fuel tank is pressure fed to the common rail 243 by the fuel pump 242, the high-pressure fuel is stored in the common rail 243, and the fuel injection valve of each of the injectors is controlled to be opened and closed. As a result, the high-pressure fuel within the common rail 243 is injected to each of the cylinders of the diesel engine 14. In other words, it is possible to precisely control an injection pressure, an injection timing and an injection period (an injection amount) of the fuel by electronically controlling the fuel injection valve of each of the injectors. Therefore, it is possible to reduce the nitrogen oxide (NOx) discharged out of the diesel engine 14.

As shown in FIGS. 13 to 16, the diesel engine 14 is mounted to the right rear portion of the travel machine body 1, and the diesel engine 14 is inward provided in the engine room 92. The second case 229 is supported vertically long to the engine room frame 91 which is provided in a rear left side of the engine room 92, and the second case 229 is arranged in a rear side surface of the engine room 92. One end sides of upper and lower second case support bodies 230 and 231 are detachably fastened by bolts to an outer periphery of the second case 229, and the other end sides of the second case support bodies 230 and 231 are provided in the outer periphery of the second case 229 so as to protrude radially. The other end sides of the upper and lower second case support bodies 230 and 231 are detachably fastened by bolts to the engine room frame 91. The tail pipe 87 is extended toward a rear side of the travel machine body 1 from a lower end side of the second case 229.

According to the structure mentioned above, the exhaust gas purified by the second case 229 is discharged toward the rear side of the travel machine body 1 from the tail pipe 87. The tail pipe 87 may be formed by a small-diameter side tail pipe and a large-diameter side tail pipe, and the exhaust gas having the lowered temperature may be discharged out of an outlet of the tail pipe 87 (the large-diameter side tail pipe) by forming a gap in connection portions of the pipes, sucking the outside air into the tail pipe 87 from the gap, and mixing the outside air into the exhaust gas from the second case 229 (the small-diameter side tail pipe).

According to the structure mentioned above, the carbon monoxide (CO) and the carbon hydride (HC) in the exhaust gas of the diesel engine 14 are reduced by the oxidation catalyst 65 and the soot filter 66 within the first case 62. Next, the urea water from the urea water injection nozzle 178 is mixed into the exhaust gas from the diesel engine 14, in the inner portion of the urea mixing pipe 239. Further, the nitrogen oxide (NOx) in the exhaust gas into which the urea water is mixed as the ammonia is reduced by the SCR catalyst 232 and the oxidation catalyst 233 within the second case 229, and is discharged externally from the tail pipe 83.

Figure 16:
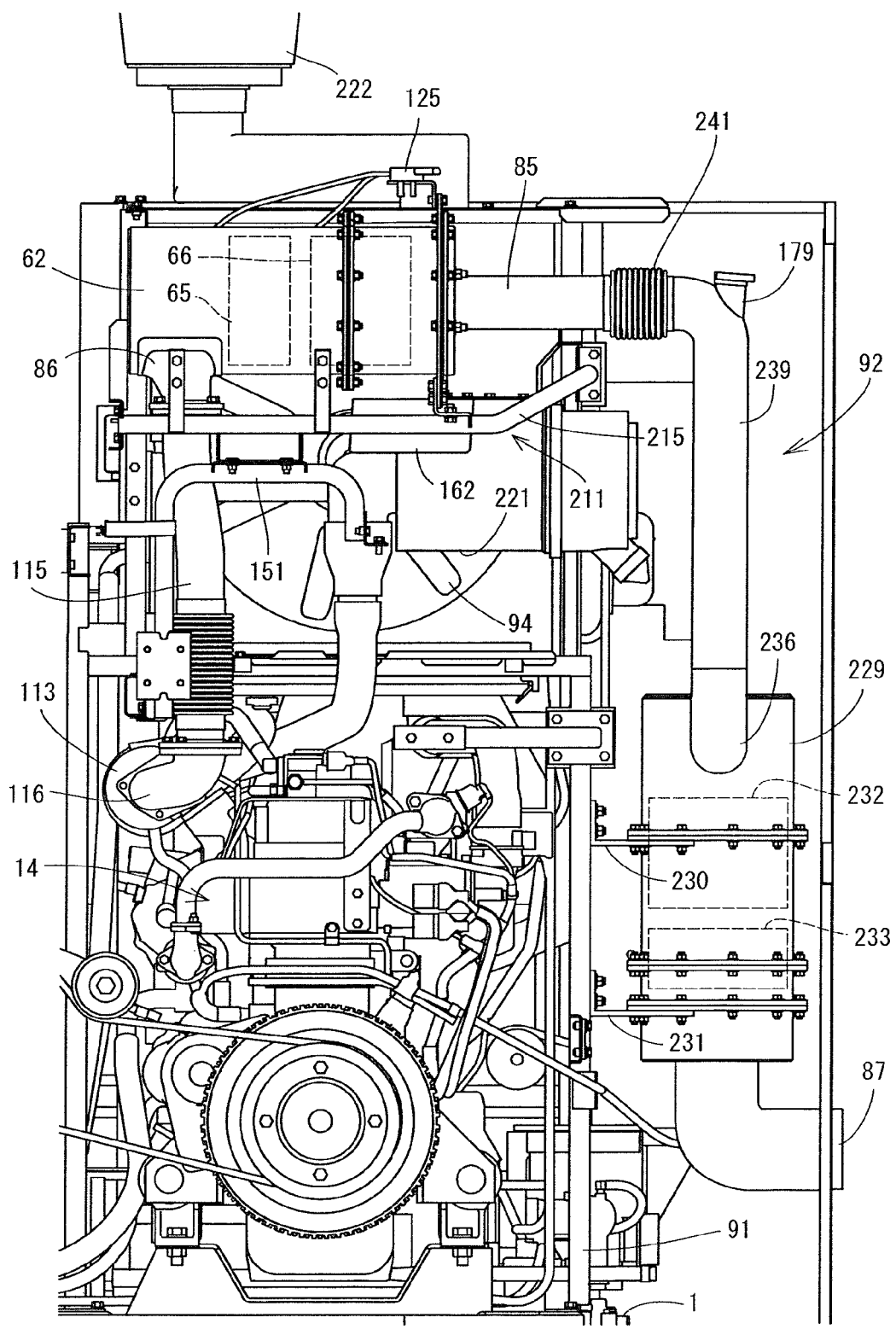
FIG. 16 is a left side elevational view of the engine and the exhaust gas purification device.

As shown in FIGS. 9 and 16, in the engine device of the working vehicle having the first case 62 which removes the particulate matter in the exhaust gas of the diesel engine 14, and the second case 229 which removes the nitrogen oxide in the exhaust gas of the diesel engine 14, the first case 62 is provided in the engine room 92 which is inward provided with the diesel engine 14, via the first case support body 211, and the second case 229 is provided in the engine room 92 via the second case support bodies 230 and 231. Therefore, the load of the first case 62 and the second case 229 can be borne by the frame 91 of the engine room 92, and the first case 62 and the second case 229 can be firmly fixed with a high rigidity by making good use of the frame 91 of the engine room 92. For example, in the combine harvester in which the diesel engine 14 is mounted to the lateral side of the rear portion of the threshing device 5, the first case 62 can be compactly assembled transversely between the engine room 92 and the threshing device 5, and the second case 229 can be compactly assembled vertically in the rear face side of the engine room 92 with the simple supporting structure.

As shown in FIGS. 1, 9 and 16, in the structure in which the second case 229 is connected to the first case 62 via the urea mixing pipe 239, and the tail pipe 87 is connected to the second case 229, the exhaust gas moving direction of the first case 62 is brought into line with the back-and-forth direction of the travel machine body 1, and the exhaust gas moving direction of the second case 229 is brought into line with the vertical direction of the travel machine body 1, whereby the exhaust gas moving direction of the diesel engine 14 is changed by the urea mixing pipe 239. Therefore, it is possible to connect the transversely arranged first case 62 and the vertically arranged second case 229 by the L-shaped exhaust gas connection path, it is possible to easily form the L-shaped exhaust gas connection path by the urea mixing pipe 239, and it is possible to easily construct the urea mixing structure for ejecting the urea water into the exhaust gas leading to the second case 229.

As shown in FIGS. 1, 2, 9 and 16, in the structure in which the threshing device 5 is arranged in adjacent to the engine room 92, the first case 62 is supported transversely between the engine room 92 and the threshing device 5, and the second case 229 is supported vertically to the side surface of the engine room 92. Therefore, in spite of the structure in which the mounting table frame 211 serving as the first case support body can be hanged between the engine room 92 and the threshing device 5, and the first case 62 can be easily installed in the narrow space between the engine room 92 and the threshing device 5, it is possible to install the second case support bodies 230 and 231 as the vertically long structure in the engine room frame 91 in the rear face side of the engine room 92, it is possible to compactly arrange the second case 229 and the tail pipe 87 connecting to the second case 229 in the second case support bodies 230 and 231 having the vertically long supporting structure, and it is possible to improve an assembling workability and a maintenance workability of the first case 62 or the second case 229.

REFERENCE SIGNS LIST

1 Travel machine body
5 Threshing device
14 Diesel engine
62 First case
87 Tail pipe
91 Engine room frame
92 Engine room
211 Mounting table frame (first support body)
211 Mounting table frame (first case support body)
229 Second case
230 Second case support body
231 Second case support body
239 Urea mixing pipe

The invention claimed is:

1. An engine device of a combine harvester, wherein an engine is provided internally in a lower section of an inner portion of an engine room that is comprised of engine room frames erected behind a harvest storage tank on a travel machine, the engine device comprising
    a first case which removes particulate matter in the exhaust gas of the engine, and a second case which removes nitrogen oxide in the exhaust gas of the engine,
    wherein the first case is mounted on and affixed via a first case support body in a transverse orientation on a mounting table frame affixed on one of said engine room frames on one side of an upper portion of the engine room adjacent to a threshing device, and positioned apart from and above the engine,
    wherein the second case is affixed vertically via a second case support body to one of said engine room frames provided on a rear side of the engine room adjacent to the work device, and positioned lower than the first case, and wherein the second case is connected to the first case via a urea mixing pipe, a tail pipe is connected to the second case, the urea mixing pipe is positioned inside the engine room behind the first case and above the second case, and the urea mixing pipe has at least one bend thereby to change direction of gas exhaust gas flow therethrough.

2. The engine device of a combine harvester according to claim 1, wherein the mounting table frame is comprised of a front upper surface frame protruding horizontally from the engine room frame at a front side of the engine room toward a side surface of the work device, and an exhaust gas purification frame having front and rear ends each affixed respectively to a front upper surface frame and one of said engine room frames at the rear side of the engine room, and an upper surface of the engine room is formed by the front upper surface frame and the exhaust gas purification frame at a position lower than a topmost surface of the engine room frame, and wherein a vertical edge of the first case support body is affixed to the engine room frame, and another vertical edge of the first case support body is affixed to an outer periphery of the second case.

* * * * *